(12) United States Patent
Shimomura

(10) Patent No.: US 9,440,880 B2
(45) Date of Patent: Sep. 13, 2016

(54) METHOD OF MANUFACTURING LIGHT-EMITTING DEVICE

(75) Inventor: Akihisa Shimomura, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 50 days.

(21) Appl. No.: 13/524,203

(22) Filed: Jun. 15, 2012

(65) Prior Publication Data

US 2012/0318023 A1    Dec. 20, 2012

(30) Foreign Application Priority Data

Jun. 17, 2011  (JP) ................... 2011-135125

(51) Int. Cl.
  *C03B 23/203*  (2006.01)
  *C03C 27/06*  (2006.01)

(52) U.S. Cl.
  CPC ..................... *C03C 27/06* (2013.01)

(58) Field of Classification Search
  CPC ........................................... C03C 27/06
  USPC .......................................... 313/512; 445/25
  See application file for complete search history.

(56) References Cited

U.S. PATENT DOCUMENTS

| | | | |
|---|---|---|---|
| 6,113,450 A | 9/2000 | Narayanan et al. | |
| 6,646,284 B2 | 11/2003 | Yamazaki et al. | |
| 6,803,246 B2 | 10/2004 | Yamazaki et al. | |
| 6,860,780 B2 | 3/2005 | Miyashita et al. | |
| 6,984,159 B1 | 1/2006 | Kado et al. | |
| 6,998,776 B2 | 2/2006 | Aitken et al. | |
| 7,121,642 B2 | 10/2006 | Stoessel et al. | |
| 7,407,423 B2 | 8/2008 | Aitken et al. | |
| 7,431,628 B2 | 10/2008 | Park et al. | |
| 7,602,121 B2 | 10/2009 | Aitken et al. | |
| 7,652,305 B2 | 1/2010 | Chatterjee et al. | |
| 7,701,136 B2 | 4/2010 | Kwak | |
| 7,780,493 B2 | 8/2010 | Choi et al. | |
| 7,837,530 B2 | 11/2010 | Park | |
| 7,841,919 B2 | 11/2010 | Lee et al. | |
| 7,868,540 B2 | 1/2011 | Kim | |
| 7,871,949 B2 | 1/2011 | Lee et al. | |
| 7,944,143 B2 | 5/2011 | Choi et al. | |

(Continued)

FOREIGN PATENT DOCUMENTS

EP    1 930 967 A1    6/2008
JP    5-208852    8/1993

(Continued)

*Primary Examiner* — Nimeshkumar Patel
*Assistant Examiner* — Jacob R Stern
(74) *Attorney, Agent, or Firm* — Husch Blackwell LLP

(57) ABSTRACT

A method of manufacturing a sealed structure with excellent hermeticity and a method of manufacturing a light-emitting device sealed with the sealed structure. In the methods of manufacturing a sealed structure and a light-emitting device using a glass frit layer, a first step of forming a buffer layer for preventing a crack generated in a substrate and the glass frit layer by laser light irradiation, a second step of forming the glass frit layer to overlap with the buffer layer over the substrate, and a third step of welding the substrates by irradiating the glass frit layer or the buffer layer with laser light are performed, whereby a sealed structure with high hermeticity and a reliable light-emitting device sealed with the sealed structure can be manufactured. By applying the method of manufacturing a light-emitting device especially to an organic EL element, a highly reliable light-emitting device can be obtained.

20 Claims, 19 Drawing Sheets

(56) References Cited

U.S. PATENT DOCUMENTS

| | | |
|---|---|---|
| 8,063,560 B2 | 11/2011 | Aitken et al. |
| 8,125,146 B2 | 2/2012 | Park |
| 8,164,257 B2 | 4/2012 | Choi et al. |
| 2004/0164671 A1* | 8/2004 | Noguchi .................. 313/504 |
| 2006/0220549 A1* | 10/2006 | Kim et al. ................ 313/512 |
| 2007/0170854 A1 | 7/2007 | Kwak |
| 2007/0176549 A1* | 8/2007 | Park ........................ 313/512 |
| 2007/0232182 A1* | 10/2007 | Park ........................... 445/25 |
| 2009/0058292 A1* | 3/2009 | Koo et al. ................ 313/512 |
| 2010/0109516 A1* | 5/2010 | Warashina et al. ...... 313/504 |
| 2011/0122633 A1 | 5/2011 | Han et al. |

FOREIGN PATENT DOCUMENTS

| | | |
|---|---|---|
| JP | 2008-147151 A | 6/2008 |
| JP | 2010-519702 | 6/2010 |
| JP | 2011-65895 | 3/2011 |
| JP | 2011-70797 | 4/2011 |
| WO | WO 2008/103338 A1 | 8/2008 |

\* cited by examiner

FIG. 9A
FIG. 9B
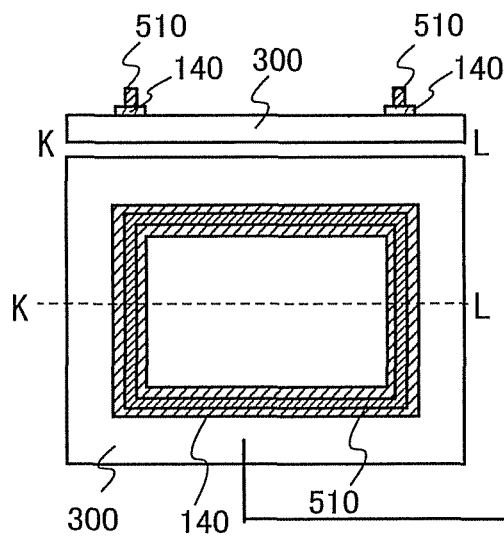
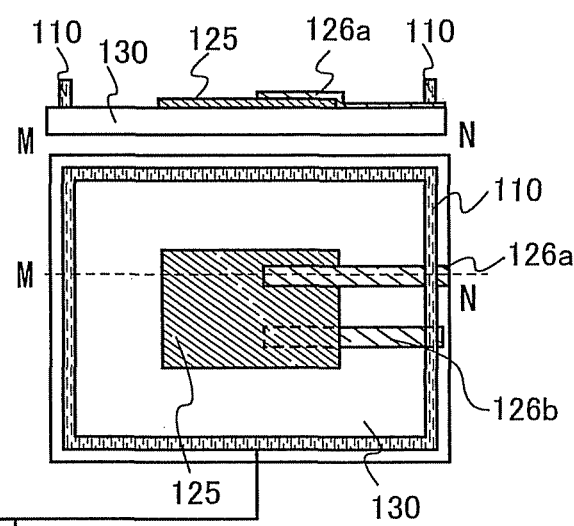
FIG. 9C
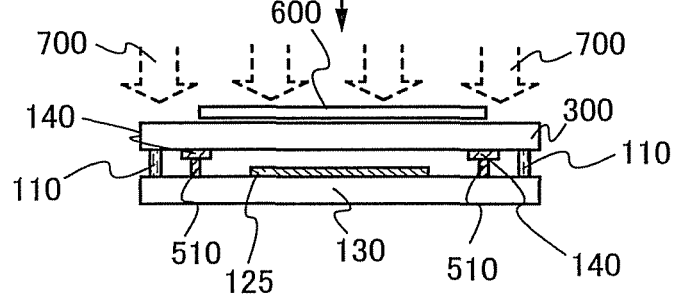
FIG. 9D
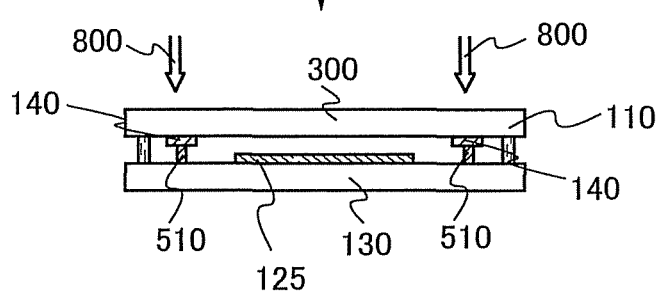

FIG. 11A
FIG. 11B
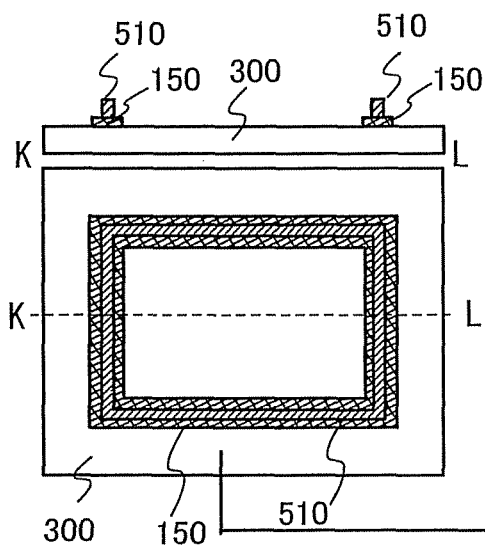
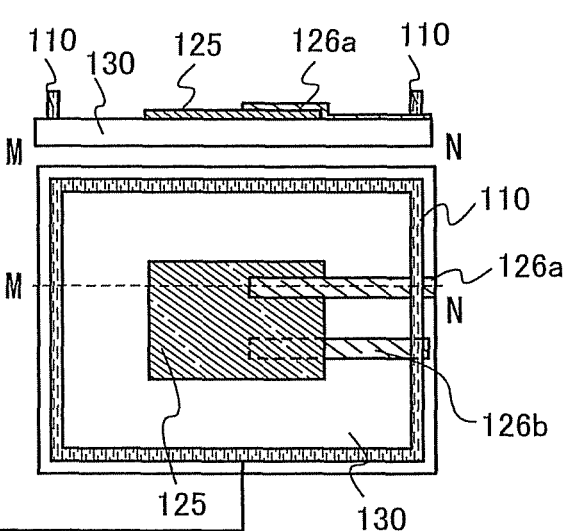
FIG. 11C
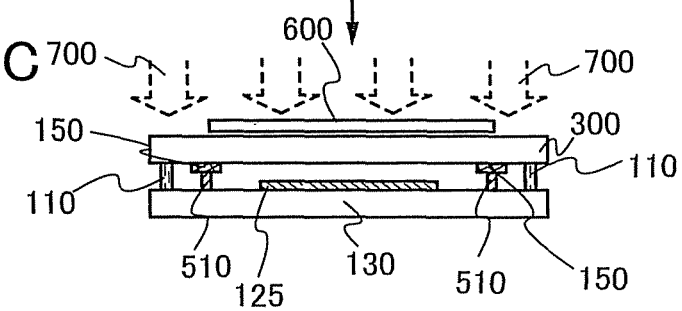
FIG. 11D
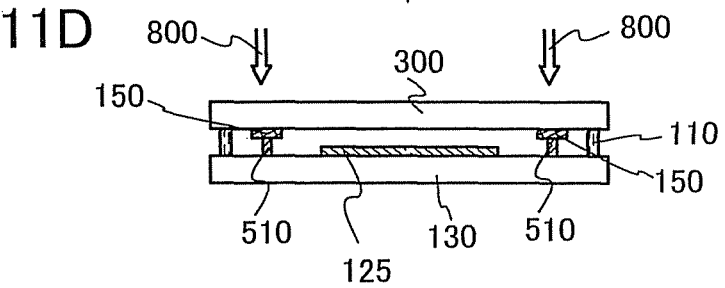

METHOD OF MANUFACTURING LIGHT-EMITTING DEVICE

BACKGROUND OF THE INVENTION

1. Field of the Invention

The present invention relates to a method of manufacturing a sealed structure which can protect an apparatus from impurities from the outside of the device and to a method of manufacturing a light-emitting device.

2. Description of the Related Art

Glass frit sealing is known as a technique of hermetically sealing a space formed by two bonded glass substrates. It is known that a sealed structure using glass frit sealing achieves excellent hermeticity, and such a sealed structure has been applied to electroluminescent (hereinafter abbreviated as EL) display devices, liquid crystal display devices, plasma display devices, and the like.

Attempts have been made to apply glass frit sealing particularly to EL display devices, expecting reliability improvement of EL elements. In organic EL elements, an organic EL layer or electrodes between which the organic EL layer is provided may rapidly decrease in reliability when exposed to moisture or oxygen. As a sealing technique using glass frit for preventing exposure of an organic EL layer and electrodes to the air, for example, the technique described in Patent Document 1 is known.

According to the technique described in Patent Document 1, glass frit paste discharged from a nozzle is applied along the edge of a glass substrate to form a partition, and the partition made of the glass frit paste is baked to form a glass frit layer. The glass frit layer is pressed to another glass substrate, heated and melted by being irradiated with laser light, and welded to the other glass substrate. Thus, a sealed structure with excellent hermeticity is formed.

REFERENCE

[Patent Document 1] Japanese Published Patent Application No. 2011-65895

SUMMARY OF THE INVENTION

One problem of a method in which a glass frit layer is irradiated with laser light to form a sealed structure is that, when a surface of the glass frit layer is irradiated with laser light, laser light may scatter, which prevents the glass frit layer being completely melted, and accordingly the glass frit layer and the glass substrate may fail to be welded.

When a glass frit layer is irradiated with laser light passing through the substrate provided with the glass frit layer, a portion of the glass frit layer on the laser light incident side, specifically in the vicinity of the interface between the substrate and the glass frit layer, is preferentially heated, and consequently a stress may be applied to the substrate provided with the glass frit layer, which makes a crack in the substrate and the glass frit layer.

A crack generated in the substrate and the glass frit layer serves as a leak path through which an atmospheric component leads to the inside of the sealed structure and impairs sealing performance. The crack also reduces the intensity of bonding of the sealed structure.

An object of one embodiment of the present invention is a method of manufacturing a sealed structure with excellent hermeticity in which generation of a crack in a substrate and a glass frit layer is suppressed.

To achieve the above object, one embodiment of the present invention focuses on a stress in a glass substrate generated when a glass frit layer is irradiated with laser light. The present invention devises a method in which a buffer layer is provided over a surface of a glass substrate and a glass frit layer is formed thereover so as to overlap with the buffer layer, and the glass frit layer is irradiated with laser light passing through the other surface of the glass substrate, which achieves the above object.

When the glass frit layer is irradiated with laser light passing through the other surface of the glass substrate, the laser light does not scatter on a surface of the glass frit layer and accordingly the glass frit layer can melt sufficiently. Thus, a failure in welding the glass substrate and the glass frit layer can be suppressed. Further, even when the glass frit layer, which is preferentially heated by being irradiated with laser light passing through the glass substrate, applies a stress to the buffer layer serving as a base of the glass frit layer, the buffer layer reduces the stress. Therefore, a crack is not made in the glass substrate.

Specifically, one embodiment of the present invention is a method of manufacturing a sealed structure including a first substrate and a second substrate, comprising the steps of a first step of forming a buffer layer capable of transmitting laser light over one surface of the second substrate capable of transmitting laser light, a second step of forming a glass frit layer overlapping with the buffer layer over the surface of the second substrate provided with the buffer layer, and a third step of irradiating the glass frit layer with the laser light passing through the other surface of the second substrate so that the glass frit layer is melted in a state where the glass frit layer is located between the first substrate and the second substrate, thereby forming a space enclosed by the glass frit layer, the first substrate, and the second substrate.

In accordance with the above manufacturing method, the buffer layer serving as a base of the glass frit layer reduces a stress applied to the second substrate which is generated by the laser light irradiation. Further, generation of a crack in the second substrate and the glass frit layer can be suppressed. Thus, a sealed structure with excellent hermeticity can be manufactured.

Further, in accordance with the above manufacturing method, since laser light irradiation is performed through the second substrate, the laser light does not scatter on a surface of the glass frit layer and accordingly the glass frit layer can melt sufficiently. Accordingly, incompleteness of welding of the glass frit layer and the first substrate can be prevented, and thus a sealed structure with excellent hermeticity can be manufactured.

One embodiment of the present invention is a method of manufacturing a sealed structure including a first substrate and a second substrate, comprising the steps of a first step of forming a buffer layer capable of absorbing laser light over one surface of the second substrate capable of transmitting laser light, a second step of forming a glass frit layer overlapping with the buffer layer over the surface of the second substrate provided with the buffer layer, and a third step of irradiating the buffer layer with the laser light passing through the other surface of the second substrate so that the glass frit layer is melted in a state where the glass frit layer is located between the first substrate and the second substrate, thereby forming a space enclosed by the glass frit layer, the first substrate, and the second substrate.

In accordance with the above manufacturing method, the buffer layer serving as a base of the glass frit layer reduces a stress applied to the second substrate which is generated by the laser light irradiation. Further, generation of a crack in the second substrate and the glass frit layer can be suppressed. Thus, a sealed structure with excellent hermeticity can be manufactured.

Further, in accordance with the above manufacturing method, since the buffer layer is irradiated with the laser light passing through the second substrate, the laser light does not scatter on a surface of the glass frit layer and accordingly the glass frit layer can melt sufficiently. Accordingly, incompleteness of welding of the glass frit layer and the first substrate can be prevented, and thus a sealed structure with excellent hermeticity can be manufactured.

Further, in accordance with the above manufacturing method, since the buffer layer capable of absorbing laser light is used, the buffer layer can be irradiated with laser light so that the glass frit layer can be melted. The buffer layer capable of absorbing laser light is formed as a flat thin film over the second substrate, and consequently laser light does not easily scatter. Hence, the welding can be performed using laser light with lower energy than that of laser light used in the case where the glass frit layer is directly irradiated with laser light.

Furthermore, it is not necessary to add a material (hereinafter, referred to as laser absorbent material) which absorbs laser light and converts it into heat to the glass frit layer, and material costs can be reduced accordingly.

One embodiment of the present invention is a sealed structure using a metal layer having a higher melting point than a glass frit layer as a buffer layer capable of absorbing laser light.

A metal having a higher melting point than a glass frit layer is not melted until the glass frit layer is melted by heat generated due to the laser light irradiation. Hence, heat can be efficiently conducted to the glass frit layer.

Further, a metal has ductility and accordingly can reduce a tensile stress generated in the second substrate. Hence, generation of a crack in the second substrate and the glass frit layer can be suppressed.

Furthermore, a metal has higher heat conductivity than an insulator and accordingly can conduct heat generated by absorption of laser light to the glass frit layer more efficiently than an insulator. Accordingly, the welding can be performed using laser light with lower energy.

Further, in the above method, the glass frit layer forms a closed curve shape, and then the first substrate and the second substrate are bonded. Thus, a sealed structure with high hermeticity in which the glass frit layer has no break can be manufactured.

One embodiment of the present invention is a method of manufacturing a light-emitting device, comprising the steps of a first step of forming a light-emitting element over one surface of a first substrate, a second step of forming a buffer layer capable of transmitting laser light in a shape surrounding the light-emitting element, over one surface of a second substrate capable of transmitting laser light, a third step of forming a glass frit layer over the overlapping with the buffer layer over the surface of the second substrate, a fourth step of bonding the first substrate and the second substrate with a sealing material in a state where the glass frit layer is located between the first substrate and the second substrate, and a fifth step of irradiating the glass frit layer with the laser light passing through the other surface of the second substrate so that the glass frit layer is melted, thereby forming a space enclosed by the glass frit layer, the first substrate, and the second substrate.

In accordance with the above method of manufacturing a light-emitting device, the buffer layer can reduce a stress applied to the second substrate which is generated by the laser light irradiation, and generation of a crack in the second substrate can be suppressed. Thus, a highly reliable light-emitting device sealed using a glass frit layer with which high hermeticity can be achieved can be manufactured.

Further, in accordance with the above method of manufacturing a light-emitting device, since laser light irradiation is performed through the second substrate, the laser light does not scatter on a surface of the glass frit layer and accordingly the glass frit layer can melt sufficiently. Accordingly, incompleteness of welding of the glass frit layer and the first substrate can be prevented, and thus a highly reliable light-emitting device can be manufactured.

Further, in accordance with the above method of manufacturing a light-emitting device, since the glass frit layer is formed on the second substrate side, heat applied in prebaking of glass frit is not conducted to the light-emitting element and hence the light-emitting element is not damaged.

One embodiment of the present invention is a method of manufacturing a light-emitting device, comprising the steps of a first step of forming a light-emitting element over one surface of a first substrate, a second step of forming a buffer layer capable of absorbing laser light in a shape surrounding the light-emitting element, over one surface of a second substrate capable of transmitting laser light, a third step of forming a glass frit layer over the overlapping with the buffer layer over the surface of the second substrate, a fourth step of bonding the first substrate and the second substrate with a sealing material in a state where the glass frit layer is located between the first substrate and the second substrate, and a fifth step of irradiating the buffer layer with the laser light passing through the other surface of the second substrate so that the glass frit layer is melted, thereby forming a space enclosed by the glass frit layer, the first substrate, and the second substrate.

In accordance with the above method of manufacturing a light-emitting device, the buffer layer can reduce a stress applied to the second substrate which is generated by the laser light irradiation, and generation of a crack in the second substrate can be suppressed. Thus, a highly reliable light-emitting device sealed using a glass frit layer with which high hermeticity can be achieved can be manufactured.

Further, in accordance with the above manufacturing method, since the buffer layer capable of absorbing laser light is used, the buffer layer can be irradiated with laser light so that the glass frit layer can be melted. The buffer layer capable of absorbing laser light is formed as a flat thin film over the second substrate, and consequently laser light does not easily scatter. Hence, the welding can be performed using laser light with lower energy than that of laser light used in the case where the glass frit layer is directly irradiated with laser light.

Furthermore, it is not necessary to add a material (hereinafter, referred to as laser absorbent material) which absorbs laser light and converts it into heat to the glass frit layer, and material costs can be reduced accordingly.

One embodiment of the present invention is a sealed structure using a metal layer having a higher melting point than a glass frit layer as a buffer layer capable of absorbing laser light.

A metal having a higher melting point than a glass frit layer is not melted until the glass frit layer is melted by heat generated due to the laser light irradiation. Hence, heat can be efficiently conducted to the glass frit layer.

Further, a metal has ductility and accordingly can reduce a tensile stress generated in the second substrate. Hence, generation of a crack in the second substrate and the glass frit layer can be suppressed.

Furthermore, a metal has higher heat conductivity than an insulator and accordingly can conduct heat generated by absorption of laser light to the glass frit layer more efficiently than an insulator. Accordingly, the welding can be performed using laser light with lower energy.

In accordance with the above method of manufacturing a light-emitting device, the first substrate and the second substrate can be sealed with the glass frit layer forming a closed curve shape. Hence, the light-emitting device can be sealed with the glass frit layer without a break. Thus, a highly reliable light-emitting device can be manufactured.

In accordance with one embodiment of the present invention, a method of manufacturing a sealed structure with excellent hermeticity can be provided. Alternatively, a method of manufacturing a highly reliable light-emitting device can be provided.

BRIEF DESCRIPTION OF THE DRAWINGS

In the accompanying drawings:

FIGS. 9A to 9D illustrate cross-sectional and plan views of a light-emitting device according to one embodiment of the present invention;

FIGS. 11A to 11D illustrate cross-sectional and plan views of a light-emitting device according to one embodiment of the present invention;

DETAILED DESCRIPTION OF THE INVENTION

Hereinafter, embodiments of the invention disclosed in this specification will be described with reference to the accompanying drawings. Note that the invention disclosed in this specification is not limited to the following description, and it is easily understood by those skilled in the art that modes and details can be variously modified without departing from the spirit and the scope of the invention. Therefore, the invention disclosed in this specification is not construed as being limited to the description of the following embodiments.

(Embodiment 1)

Figure 1:
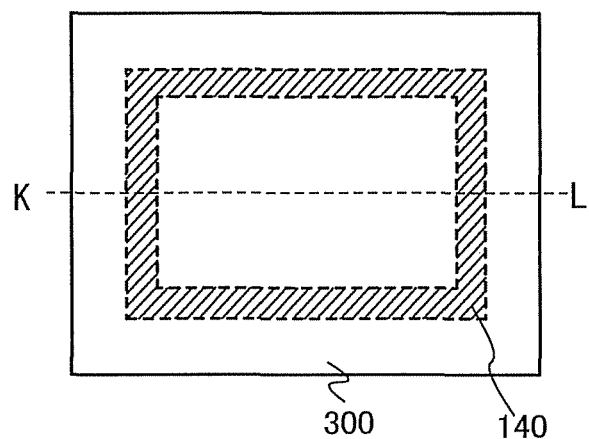
FIG. 1 illustrates a cross-sectional and a plan view of a sealed structure according to one embodiment of the present invention.
Figure 1:
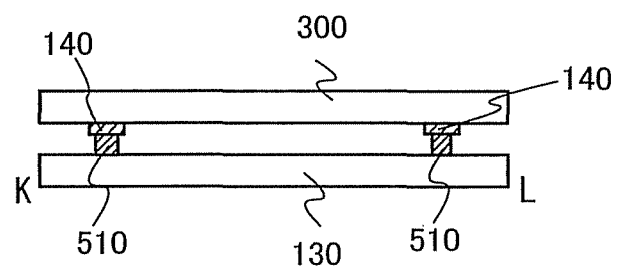

In this embodiment, the way how a sealed structure 161 illustrated in FIG. 1 is manufactured using a manufacturing method according to one embodiment of the present invention is described with reference to FIGS. 2A to 2C and FIG. 3.

Forming Buffer Layer

First, a buffer layer 140 is formed over a second substrate 300. For the second substrate 300, glass is used here, but other materials can be used as long as the second substrate 300 is capable of transmitting laser light because later-described laser light irradiation is performed through the second substrate 300.

For a film which forms the buffer layer 140, silicon oxide or silicon nitride can be used. A silicon oxide film or a silicon nitride film is formed by a plasma CVD method. In order to reduce a tensile stress generated in the second substrate 300 by the later-described laser light irradiation, the buffer layer 140 has a compressive stress.

Figure 2A:
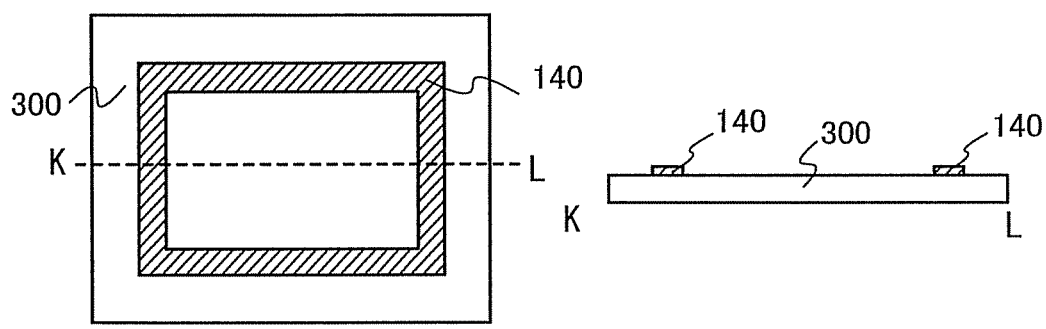
FIGS. 2A to 2C a cross-sectional and a plan view of a manufacturing step of a sealed structure according to one embodiment of the present invention.

The buffer layer 140 is formed in a region where a glass frit layer 510 is to be formed (FIG. 2A). The buffer layer 140 can be formed by a known technique, for example, formed by etching with a resist mask formed using a photomask.

Applying Glass Frit Paste

Figure 2B:
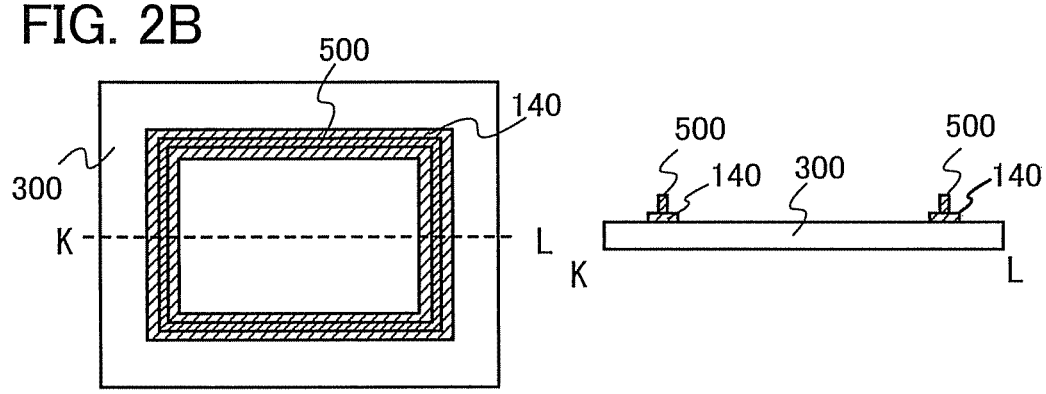

Next, a glass frit paste 500 is applied to the second substrate 300 so as to overlap with the buffer layer 140 (FIG. 2B). The glass frit paste 500 contains powdered glass and a binder. The powdered glass preferably include at least one compound selected from, for example, magnesium oxide, calcium oxide, barium oxide, lithium oxide, sodium oxide, potassium oxide, boron oxide, vanadium oxide, zinc oxide, tellurium oxide, aluminum oxide, silicon dioxide, lead oxide, tin oxide, phosphorus oxide, ruthenium oxide, rhodium oxide, iron oxide, copper oxide, titanium oxide, tungsten oxide, bismuth oxide, antimony oxide, lead borate glass, tin phosphate glass, vanadate glass, and borosilicate glass. The glass frit paste is prepared by mixing such a compound with a resin binder diluted with an organic solvent, for example. In order that the glass frit layer 510 can be heated in the later-described laser light irradiation, a glass frit paste to which a laser light absorbent material is added is used. The laser absorbent material is selected as appropriate depending on the wavelength of the laser light used.

A method of applying the glass frit paste 500 can be a dispenser method, a screen printing method, or an inkjet method. In this embodiment, the glass frit paste 500 is applied so as to form a rectangle shape suitable for sealing of a display device or the like, but may be applied to form other shapes such as a circular shape or an elliptical shape as long as it has a closed curve shape.

Baking Glass Frit Paste

Figure 2C:
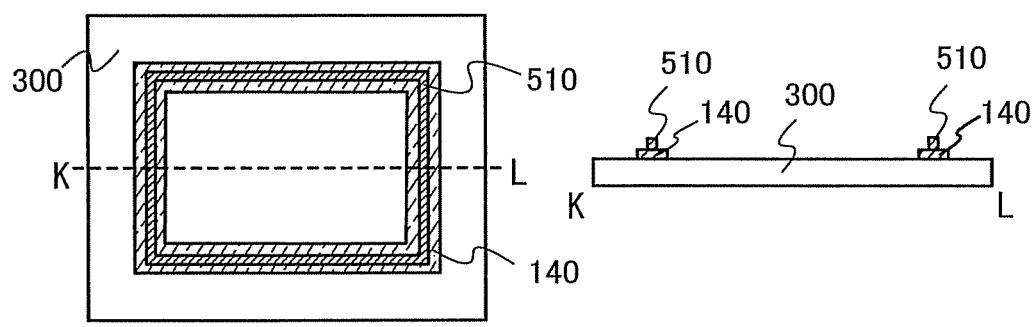

Heating treatment is performed in order to vaporize the binder in the glass frit paste. Specifically, the temperature of the heating treatment is preferably 300° C. to 450° C. The heat treatment is performed using a lamp, a heater, or the like. The powdered glass is melted and solidified through the heat treatment, whereby the powdered glass is fused; thus, the glass frit layer 510 can be formed. At this step of baking, the glass frit layer 510 is formed over the second substrate 300 so as to have a closed curve shape without a break (FIG. 2C). This is in order that the sealed structure with excellent hermeticity can be formed.

Laser Light Irradiation

Figure 3:
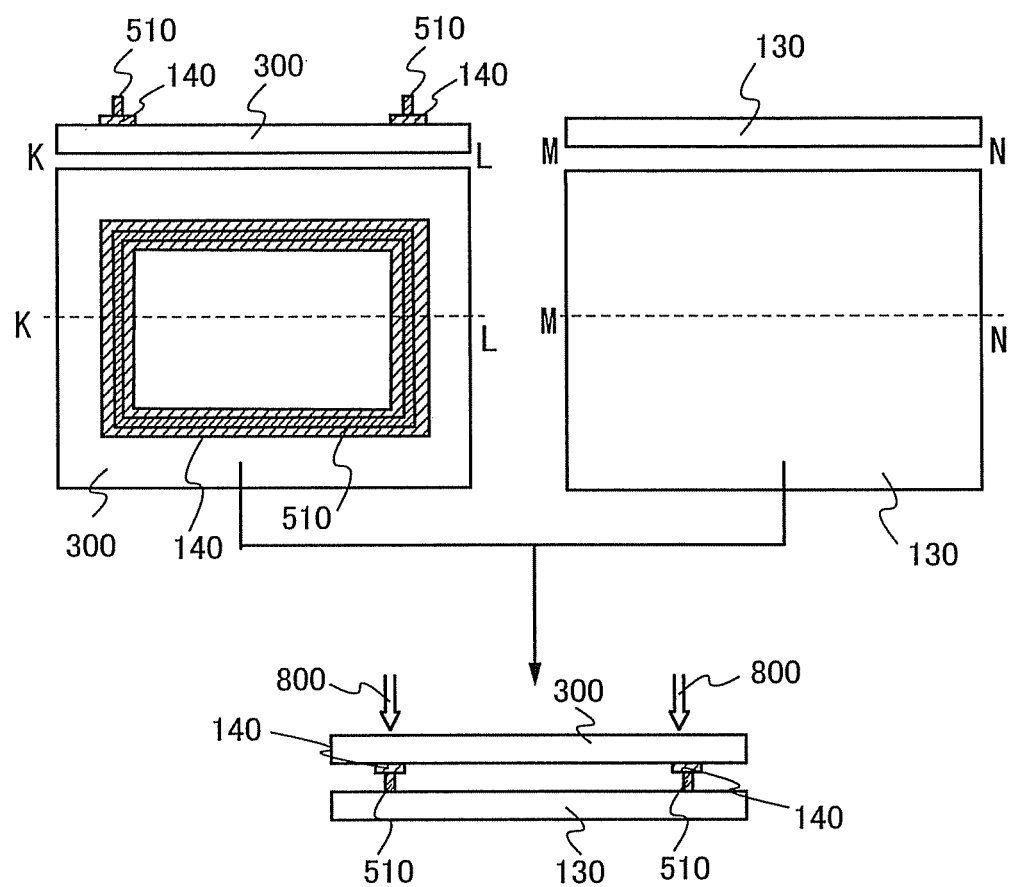
FIG. 3 illustrates a cross-sectional and a plan view of a manufacturing process of a sealed structure according to one embodiment of the present invention.

Next, the glass frit layer 510 over the second substrate 300 is closely bonded to the first substrate 130, and the glass frit layer 510 is irradiated with laser light 800 (FIG. 3). Consequently, the second substrate 300 and the first substrate 130 are bonded by melting of the glass frit layer 510. The glass frit layer 510 is irradiated with the laser light 800 passing through the second substrate 300. The laser light does not scatter on a surface of the glass frit layer 510 and accordingly the glass frit layer 510 melts sufficiently. Hence, a sealed structure with high hermeticity in which the glass frit layer 510 and the first substrate 130 are welded can be obtained. The wavelength of the laser light used can be 750 nm to 1200 nm. A 800-nm semiconductor laser is preferred.

If a substrate directly provided with a glass frit layer is irradiated with laser light, a portion where the glass frit layer is in contact with the substrate locally undergoes a rapid temperature rise and then rapid cooling. Consequently, the substrate may suffer a large tensile stress locally, leading to a crack in the substrate and the glass frit layer. However, since the second substrate 300 in this embodiment is provided with the buffer layer 140, a tensile stress generated in the glass frit layer 510 irradiated with the laser light 800 can be reduced and accordingly generation of a crack in the second substrate 300 can be suppressed. Thus, a sealed structure with excellent hermeticity can be manufactured.

Through the above steps, the sealed structure 161 illustrated in FIG. 1 can be manufactured.

As described above, in accordance with the method of manufacturing the sealed structure 161 described in this embodiment, the buffer layer 140 reduces a stress generated in the second substrate 300 due to irradiation with the laser light 800 and suppresses generation of a crack in the second substrate 300. Accordingly, the sealed structure 161 with high hermeticity can be manufactured.

In the method of manufacturing the sealed structure 161 described in this embodiment, since irradiation with the laser light 800 is performed through the second substrate 300, the laser light 800 does not scatter on a surface of the glass frit layer 510 and accordingly the glass frit layer 510 can melt sufficiently. Thus, the sealed structure 161 with excellent hermeticity can be manufactured.

(Embodiment 2)

Figure 4:
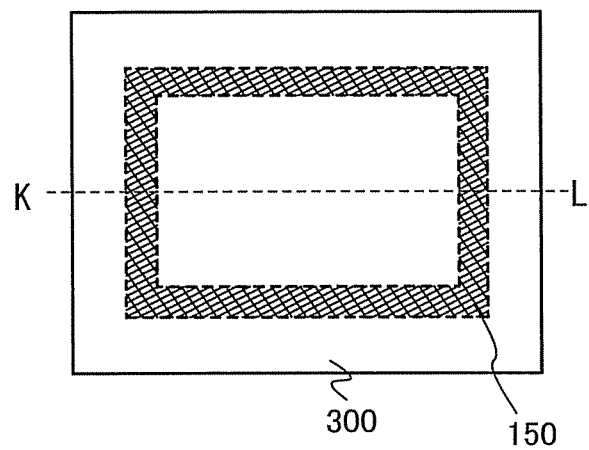
FIG. 4 illustrates a cross-sectional and a plan view of a sealed structure according to one embodiment of the present invention.
Figure 4:
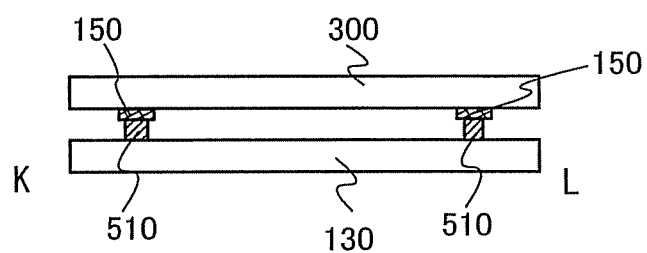

In this embodiment, the way how a sealed structure 162 illustrated in FIG. 4 is manufactured using a manufacturing method according to one embodiment of the present invention is described with reference to FIG. 5 and FIG. 6.

Forming Buffer Layer

First, a buffer layer 150 is formed over a second substrate 300. For the second substrate 300, glass is used here, but other materials can be used as long as the second substrate 300 is capable of transmitting laser light because the later-described laser light irradiation is performed through the second substrate 300.

Figure 5:
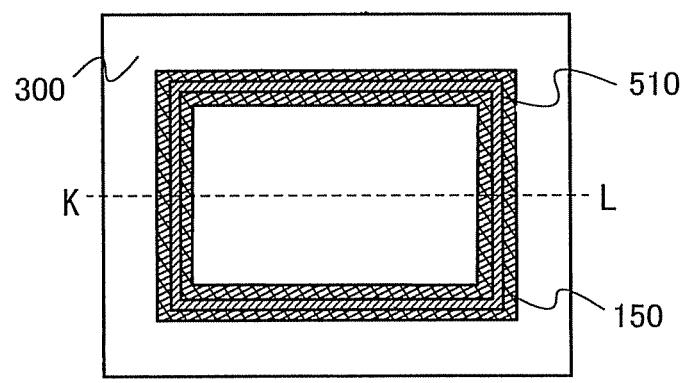
FIG. 5 illustrates a cross-sectional and a plan view of a manufacturing process of a sealed structure according to one embodiment of the present invention.
Figure 5:
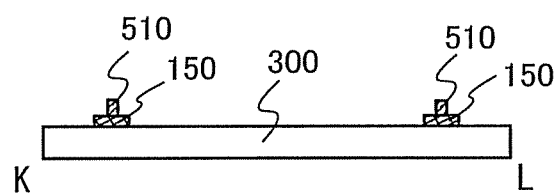

The buffer layer 150 is formed in a region where the glass frit layer 510 is to be formed (FIG. 5). The buffer layer 150 can be formed by a known technique, for example, formed by etching with a resist mask formed using a photomask.

A film which forms the buffer layer 150 can be formed with a substance which absorbs laser light and has a higher melting point than glass. Specifically, silicon, an insulator such as diamond like carbon (DLC), a metal such as tungsten, tantalum, or iron can be used. A plasma CVD method can be used in the case of silicon or diamond like carbon (DLC), and a sputtering method can be used in the case of a metal.

In order to reduce a tensile stress generated in the second substrate 300 by the later-described laser light irradiation, silicon or an insulator such as diamond like carbon (DLC) preferably has a compressive stress.

Alternatively, the buffer layer 150 may be a layer having ductility formed with a metal such as tungsten, tantalum, or iron, instead of silicon or an insulator such as diamond like carbon (DLC). Since a metal having a higher melting point than a glass frit layer does not melt before the glass frit layer melts through heat generation due to the laser light irradiation, heat can be efficiently conducted to the glass frit layer.

Applying Glass Frit Paste

Next, the glass frit paste 500 is applied so as to overlap with the buffer layer 150 over the second substrate 300 (FIG. 5). In this embodiment, a glass frit paste not containing a laser absorbent material is used. Embodiment 1 can be referred to for the other materials and the application method of the glass frit paste.

Baking Glass Frit Paste

Embodiment 1 can be referred to for the step of forming the glass frit layer 510 by baking the glass frit paste 500. At this step of baking, the glass frit layer 510 is formed over the second substrate 300 so as to have a closed curve shape without a break (FIG. 5). This is in order that the sealed structure with excellent hermeticity can be formed.

Laser Light Irradiation

Figure 6:
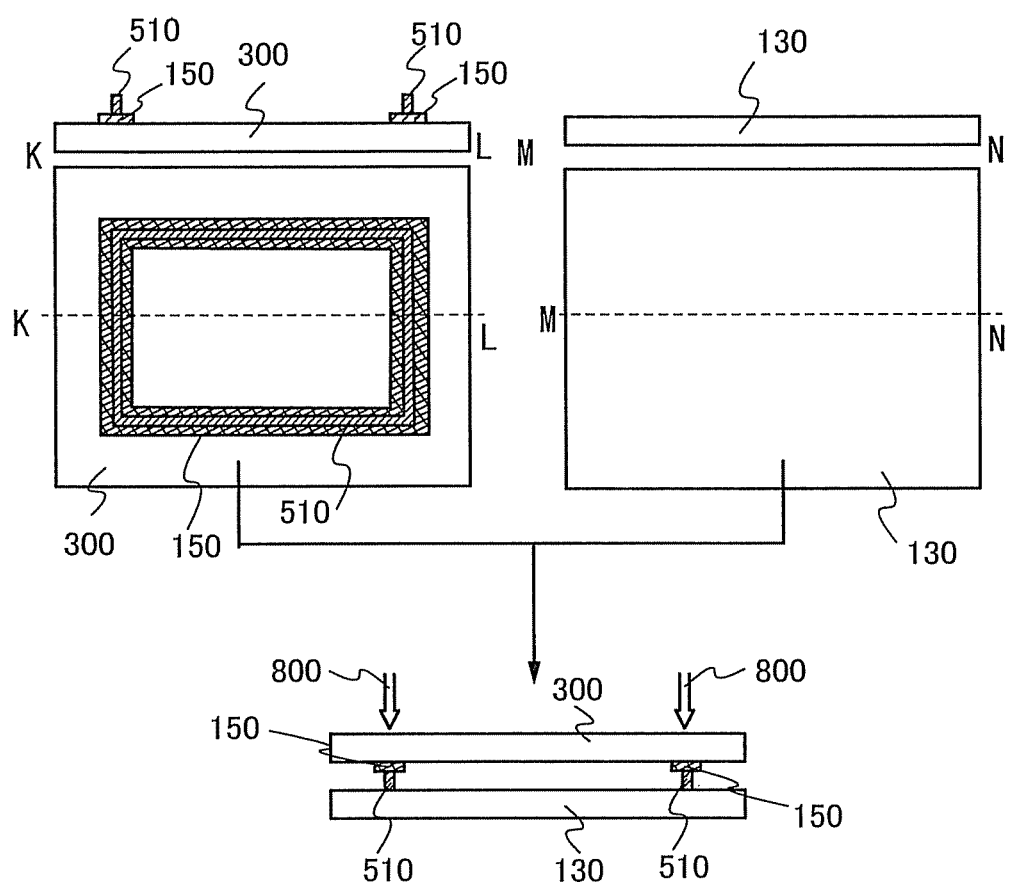
FIG. 6 illustrates a cross-sectional and a plan view of a manufacturing process of a sealed structure according to one embodiment of the present invention.

Next, the glass frit layer 510 over the second substrate 300 is closely bonded to the first substrate 130, and laser light irradiation is performed (FIG. 6). The buffer layer 150 is irradiated with the laser light 800 passing through the second substrate 300. The buffer layer 150 absorbs the laser light 800 and heat conducted through the buffer layer 150 melts the glass frit layer 510, whereby the glass frit layer 510 and the first substrate are welded, and thus the glass frit layer 510, the first substrate 130, and the second substrate 300 form an enclosed space. A glass frit layer has a non-uniform thickness and has an uneven surface, and hence if the structure in which the glass frit layer absorbs laser light without a buffer layer is employed, the laser light can scatter. In contrast, the buffer layer 150 capable of absorbing laser light is formed as a thin film with a uniform thickness over the second substrate 300 and has a surface without unevenness, and consequently the laser light does not easily scatter. Accordingly, the buffer layer 150 can absorb the laser light more efficiently than the glass frit layer 510. Hence, the welding can be performed using laser light with lower energy than that of laser light used in the case where the glass frit layer is directly irradiated with laser light. In particular, when a metal such as tungsten, tantalum, or iron is used for the buffer layer 150, laser light can be more easily absorbed; accordingly, the welding can be performed using laser light with lower energy than that of laser light used in the case where the glass frit layer 510 is directly irradiated with laser light. The wavelength of the laser light used can be 750 nm to 1200 nm. Specifically, a 800-nm semiconductor laser is preferred.

If a substrate directly provided with a glass frit layer is irradiated with laser light, a portion where the glass frit layer is in contact with the substrate locally undergoes a rapid temperature rise and then rapid cooling. Consequently, the substrate may locally suffer a large tensile stress, leading to a crack in the substrate and the glass frit layer. However, when a layer having a compressive stress is used as the buffer layer 150, a tensile stress generated in the second substrate 300 can be reduced and accordingly generation of a crack in the second substrate 300 can be suppressed.

Further, when a metal having ductility is used for the buffer layer 150, a tensile stress generated in the second substrate 300 due to laser light irradiation can be reduced and accordingly generation of a crack in the second substrate 300 can be suppressed.

The buffer layer 150 capable of absorbing laser light is formed as a flat thin film over the second substrate 300, and consequently laser light does not easily scatter. Hence, the welding can be performed using laser light with lower energy than that of laser light used in the case where the substrate directly provided with the glass frit layer is irradiated with laser light.

When the metal having a higher melting point than the glass frit layer is used for the buffer layer 150, since the heat conductivity of the metal is higher than that of an insulator, heat generated by absorption of laser light can be conducted to the glass frit layer more efficiently than when an insulator is used. Accordingly, the welding can be performed using laser light with lower energy.

With the buffer layer 150 capable of absorbing laser light, a laser absorbent material does not need to be added to the glass frit paste 500. Accordingly, the material costs of the glass frit paste can be reduced.

Note that a method of manufacturing a sealed structure according to one embodiment of the present invention is not limited to the structure where the glass frit paste 500 is used, but can be used for the structure where an extremely thin linear glass film is used. For example, a linear glass thin film having a thickness greater than or equal to 100 nm and less than or equal to 500 µm, preferably greater than or equal to 100 nm and less than or equal to 100 µm, is used instead of the glass frit layer 510. The glass thin film is melted by being indirectly heated through irradiation of the buffer layer 150 with laser light, whereby the glass thin film and the first substrate 130 are welded and the glass thin film, the first substrate 130, and the second substrate 300 form an enclosed space. Such a linear glass thin film does not need prebaking unlike the glass frit paste 500, which simplifies the process.

Through the above steps, the sealed structure 162 illustrated in FIG. 4 can be manufactured.

As described above, in accordance with the method of manufacturing the sealed structure 162 described in this embodiment, when a layer having a compressive stress is used for the buffer layer 150, the buffer layer 150 reduces a stress generated in the second substrate 300 due to irradiation with the laser light and suppresses generation of a crack in the second substrate 300. Accordingly, the sealed structure 162 with high hermeticity can be manufactured.

When a metal having ductility is used for the buffer layer 150, the buffer layer 150 reduces a stress generated in the second substrate 300 due to irradiation with the laser light and suppresses generation of a crack in the second substrate 300. Accordingly, the sealed structure 162 with high hermeticity can be manufactured.

In the method of manufacturing the sealed structure 162 described in this embodiment, the buffer layer 150 is irradiated with the laser light 800 so that the glass frit layer 510 is melted. Since the buffer layer 150 is formed as a flat thin film over the second substrate 300, the laser light 800 does not easily scatter. Hence, the welding can be performed using laser light with lower energy than that of laser light used in the case where the glass frit layer 510 is directly irradiated with the laser light. When the metal is used for the buffer layer 150, since the heat conductivity of the metal is higher than that of an insulator, heat generated by absorption of the laser light 800 can be conducted to the glass frit layer 510 more efficiently than when an insulator is used. Accordingly, the welding can be performed using laser light with lower energy. In addition, a laser absorbent material does not need to be added to the glass frit paste 500. Accordingly, the material costs of the glass frit paste 500 can be suppressed.

(Embodiment 3)

Figure 7:
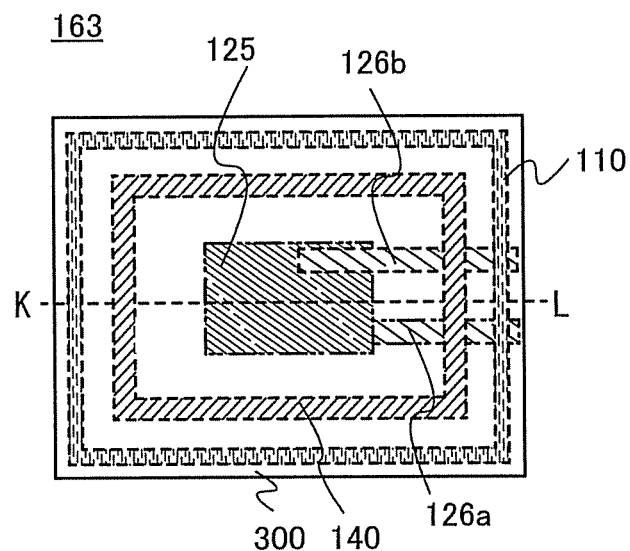
FIG. 7 illustrates a cross-sectional and a plan view of a light-emitting device according to one embodiment of the present invention.
Figure 7:
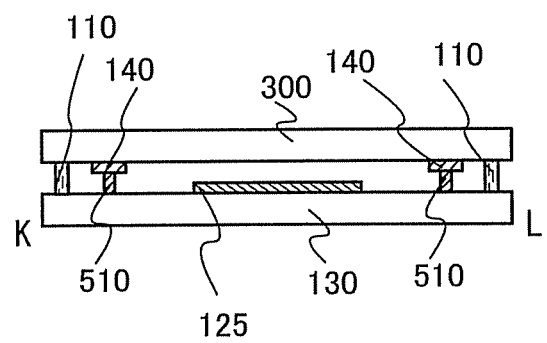

In this embodiment, one mode of a method of manufacturing a light-emitting device 163 illustrated in FIG. 7 is described with reference to FIGS. 8A and 8B and FIGS. 9A to 9D. In this embodiment, an organic EL element is adapted as one mode of the light-emitting element.

Forming Buffer Layer

First, the buffer layer 140 is formed over the second substrate 300. For the second substrate 300, although glass is used, other materials can be used as long as the second substrate 300 is capable of transmitting laser light because later-described laser light irradiation is performed through the second substrate 300. The buffer layer 140 is formed in a region where the glass frit layer 510 is to be formed. The buffer layer 140 is formed over the second substrate 300 so that the buffer layer 140 is located to surround the organic EL element 125 when viewed from the top in the state where the second substrate 300 and the first substrate 130 are bonded. The pattern of the buffer layer 140 can be formed by a known technique, for example, etching.

Silicon oxide or silicon nitride can be used for the buffer layer 140. A silicon oxide film or a silicon nitride film is formed by a plasma CVD method described later. In order to reduce a tensile stress generated in the second substrate 300 by the later-described laser light irradiation, the buffer layer 140 is preferably a layer having a compressive stress.

Applying Glass Frit Paste

Next, the glass frit paste 500 is applied so as to overlap with the buffer layer 140 over the second substrate 300, which can be carried out as described in Embodiment 1.

Baking Glass Frit Paste

Embodiment 1 can be referred to for the step of forming the glass frit layer 510 by baking the glass frit paste 500. At this step of baking, the glass frit layer 510 is formed over the second substrate 300 so as to have a closed curve shape. This is in order that the organic EL element 125 can be sealed in a sealed structure with high hermeticity.

Forming Organic EL Element

Figure 8A:
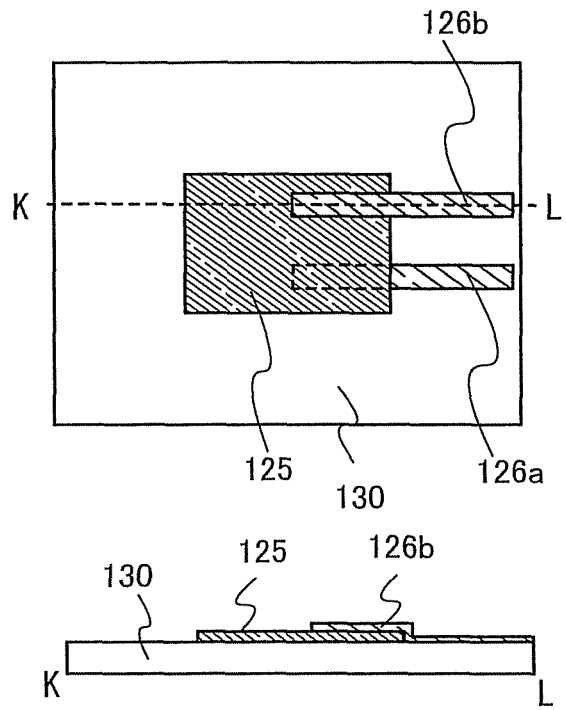
FIGS. 8A and 8B a cross-sectional and a plan view of a manufacturing step of a light-emitting device according to one embodiment of the present invention.

First, as illustrated in FIG. 8A, the organic EL element 125 is provided over the first substrate 130. For example, the organic EL element 125 has a stacked structure in which an anode, a light-emitting layer, and a cathode are stacked in this order over the first substrate 130. Note that the order of the anode and the cathode may be changed. Further, another layer may be provided in addition to the above. Terminals 126a and 126b are led from the anode and the cathode, respectively, and connected to an external power source, whereby power can be supplied to the organic EL element 125.

Forming Sealing Material

Figure 8B:
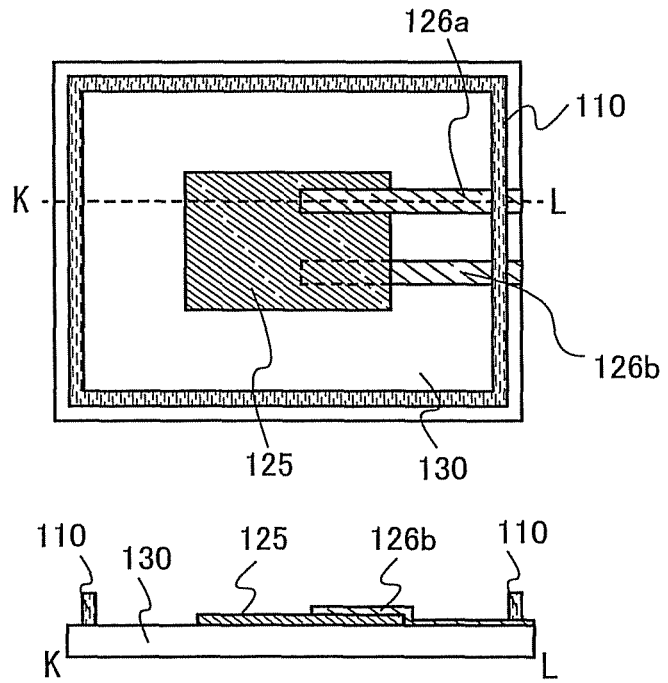

Next, as illustrated in FIG. 8B, a sealing material 110 is formed so as to surround the organic EL element 125 and not to overlap with a region where the glass frit layer 510 is formed. The reason why the first substrate 130 and the second substrate 300 are bonded with the sealing material 110 is that the glass frit layer 510 has no viscosity and the position adjustment of the first substrate 130 and the second substrate is difficult. As the sealing material 110, an ultraviolet curable resin, an epoxy resin, or the like is used, and the sealing material 110 can be applied by a dispenser method or a screen printing method. The sealing material 110 is formed in a closed curve shape over the first substrate 130. This is in order that entry of the outside air can be prevented also by the sealing material 110. Note that the closed curve shape of the sealing material 110 may be inside or outside the region where the glass frit layer 510 is formed.

Curing Sealing Material

Next, the first substrate 130 which is provided with the organic EL element 125 and to which the sealing material 110 is applied is bonded to the second substrate 300 provided with the glass frit layer 510. In the case where an ultraviolet curable resin is used, the organic EL element 125 is protected from an ultraviolet ray by a light shielding mask 600, and then the sealing material 110 is irradiated with an ultraviolet ray 700 and cured, whereby the first substrate 130 and the second substrate are bonded (FIG. 9C).

Laser Light Irradiation

Next, the glass frit layer 510 is melted by being irradiated with laser light so that the glass frit layer 510 and the first substrate 130 can be welded (FIG. 9D). The glass frit layer 510 is irradiated with the laser light passing through the second substrate 300. The laser light does not scatter on a surface of the glass frit layer 510 and accordingly the glass frit layer 510 can melt sufficiently. The wavelength of the laser light used can be 750 nm to 1200 nm. Specifically, a 800-nm semiconductor laser is preferred.

If a substrate directly provided with a glass frit layer is irradiated with laser light, a portion where the glass frit layer is in contact with the substrate locally undergoes a rapid temperature rise and then rapid cooling. Consequently, the substrate may locally suffer a large tensile stress, leading to a crack in the substrate and the glass frit layer. However, the buffer layer 140 reduces a tensile stress generated in the second substrate 300, thereby suppressing generation of a crack in the second substrate 300.

Through the above steps, the light-emitting device 163 illustrated in FIG. 7 can be manufactured.

As described above, in accordance with the method of manufacturing the light-emitting device 163 described in this embodiment, generation of a crack in the second substrate 300 can be suppressed. This is because the buffer layer 140 reduces a stress generated in the second substrate 300 due to irradiation with the laser light and suppresses generation of a crack in the second substrate 300. The glass frit layer 510 has hermeticity and hence can suppress entry of moisture and atmospheric components from the outside of the light-emitting device. Thus, the light-emitting device 163 whose reliability is improved by highly hermetic sealing can be manufactured.

In the method of manufacturing the light-emitting device 163 described in this embodiment, since irradiation with the laser light is performed through the second substrate 300, the laser light does not scatter on a surface of the glass frit layer 510 and accordingly the glass frit layer 510 can melt sufficiently. Thus, incompleteness of welding of the glass frit layer 510 and the first substrate 130 can be prevented. Thus, the light-emitting device 163 whose reliability is improved by highly hermetic sealing can be manufactured.

(Embodiment 4)

Figure 10:
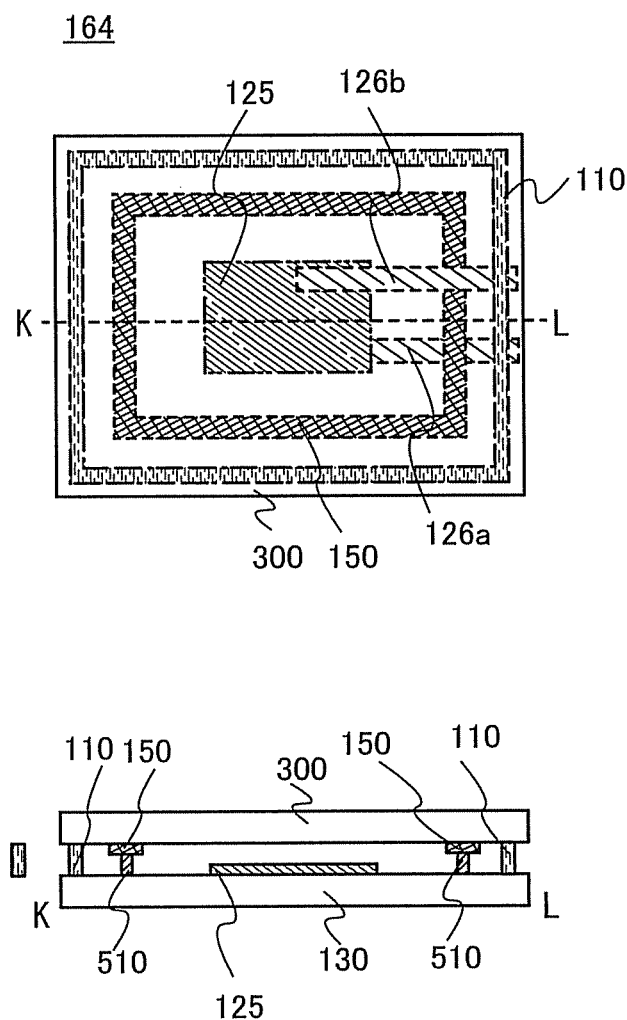
FIG. 10 illustrates a cross-sectional and a plan view of a light-emitting device according to one embodiment of the present invention.

In this embodiment, one mode of a method of manufacturing a light-emitting device 164 illustrated in FIG. 10 is described with reference to FIGS. 11A to 11D.

Forming Buffer Layer

First, the buffer layer 150 is formed over the second substrate 300. For the second substrate 300, although glass is used, other materials can be used as long as the second substrate 300 is capable of transmitting laser light because later-described laser light irradiation is performed through the second substrate 300. The buffer layer 150 is formed in a region where the glass frit layer 510 is to be formed (FIG. 11C). The buffer layer 150 can be formed by a known technique, for example, formed by etching with a resist mask formed using a photomask. As described later, through the glass frit layer 510, the second substrate 300 is bonded to the first substrate 130 used to form a light-emitting element. Hence, the buffer layer 150 is formed over the second substrate 300 so that the buffer layer 150 is located to surround the light-emitting element when viewed from the top in the state where the substrates are bonded.

Embodiment 2 can be referred to for the structure and formation of the buffer layer 150.

Applying Glass Frit Paste

Next, the glass frit paste 500 is applied so as to overlap with the buffer layer 150 over the second substrate 300. In this embodiment, a glass frit paste not containing a laser light absorbent material is used. Embodiment 1 can be referred to for the other materials and the application method for the glass frit paste.

Baking Glass Frit Paste

Embodiment 1 can be referred to for the step of forming the glass frit layer 510 by baking the glass frit paste 500. At this step of baking, the glass frit layer 510 is formed over the second substrate 300 so as to have a closed curve shape without a break. This is in order that the sealed structure with high hermeticity can be formed.

Forming Organic EL Element and Sealing Material

Embodiment 3 can be referred to for the step of providing the organic EL element 125 over the first substrate 130, the step of forming the sealing material 110 over the first substrate 130, and the step of curing the sealing material 110 thereby bonding the first substrate 130 and the second substrate 300.

Laser Light Irradiation

Next, the glass frit layer 510 over the second substrate 300 is closely bonded to the first substrate 130, and irradiation with the laser light 800 is performed (FIG. 11D). The buffer layer 150 is irradiated with the laser light 800 passing through the second substrate 300. The buffer layer 150 absorbs the laser light 800 and heat conducted through the buffer layer 150 melts the glass frit layer 510, whereby the glass frit layer 510 and the first substrate are welded, and thus the glass frit layer 510, the first substrate 130, and the second substrate 300 form an enclosed space. The buffer layer 150 capable of absorbing laser light is formed as a flat thin film over the second substrate, and consequently the laser light does not easily scatter. Since the laser light thus does not easily scatter, the buffer layer 150 more efficiently absorbs the laser light than the glass frit layer 510. Hence, the welding can be performed using laser light with lower energy than that of laser light used in the case where the glass frit layer 510 is directly irradiated with laser light. In particular, when a metal such as tungsten, tantalum, or iron is used for the buffer layer 150, laser light can be more easily absorbed; accordingly, the welding can be performed using laser light with lower energy than that of laser light used in the case where the glass frit layer 510 is directly irradiated with laser light. The wavelength of the laser light used can be 750 nm to 1200 nm. Specifically, a 800-nm semiconductor laser is preferred.

If a substrate directly provided with a glass frit layer is irradiated with laser light, a portion where the glass frit layer is in contact with the substrate locally undergoes a rapid temperature rise and then rapid cooling. Consequently, the substrate may locally suffer a large tensile stress, leading to a crack in the substrate and the glass frit layer. However, when a layer having a compressive stress is used as the buffer layer 150, a tensile stress generated in the second substrate 300 can be reduced and accordingly generation of a crack in the second substrate 300 can be suppressed.

Further, when a metal having ductility is used for the buffer layer 150, a tensile stress generated in the second substrate 300 due to laser light irradiation can be reduced and accordingly generation of a crack in the second substrate 300 can be suppressed.

A glass frit layer has a non-uniform thickness and has an uneven surface, and hence if the structure in which the glass frit layer absorbs laser light without a buffer layer is employed, the laser light can scatter. In contrast, the buffer layer 150 capable of absorbing laser light is formed as a thin film with a uniform thickness over the second substrate 300 and has a surface without unevenness, and consequently the laser light does not easily scatter. Therefore, the buffer layer 150 can absorb the laser light more efficiently than the glass frit layer 510. Hence, the welding can be performed using laser light with lower energy than that of laser light used in the case where the glass frit layer is directly irradiated with laser light.

When the metal having a higher melting point than the glass frit layer is used for the buffer layer, since the heat conductivity of the metal is higher than that of an insulator, heat generated by absorption of laser light can be conducted to the glass frit layer more efficiently than when an insulator is used. Accordingly, the welding can be performed using laser light with lower energy.

With the buffer layer 150 capable of absorbing laser light, a laser absorbent material does not need to be added to the glass frit paste. Accordingly, the material costs of the glass frit paste can be reduced.

Note that a method of manufacturing a sealed structure according to one embodiment of the present invention is not limited to the structure where the glass frit paste 500 is used, but can be used for the structure where an extremely thin linear glass film is used. For example, a linear glass thin film having a thickness greater than or equal to 100 nm and less than or equal to 500 µm, preferably greater than or equal to 100 nm and less than or equal to 100 µm, is used instead of the glass frit layer 510. The glass thin film is melted by being indirectly heated through irradiation of the buffer layer 150 with laser light, whereby the glass thin film and the first substrate 130 are welded and the glass thin film, the first substrate 130, and the second substrate 300 form an enclosed space. Such a linear glass thin film does not need prebaking unlike the glass frit paste 500, which simplifies the process.

Through the above steps, the light-emitting device 164 illustrated in FIG. 10 can be manufactured.

As described above, in accordance with the method of manufacturing the light-emitting device 164 described in this embodiment, when a layer having a compressive stress is used for the buffer layer 150, the buffer layer 150 reduces a stress generated in the second substrate 300 due to irradiation with the laser light and suppresses generation of a crack in the second substrate 300. Thus, the light-emitting device 164 with high hermeticity can be manufactured.

When a metal having ductility is used for the buffer layer 150, the buffer layer 150 reduces a stress generated in the second substrate 300 due to irradiation with the laser light and suppresses generation of a crack in the second substrate 300. Thus, the light-emitting device 164 with high hermeticity can be manufactured.

In the method of manufacturing the light-emitting device 164 described in this embodiment, the buffer layer 150 is irradiated with the laser light 800 so that the glass frit layer 510 is melted. Since the buffer layer 150 is formed as a flat thin film over the second substrate 300, the laser light does not easily scatter. Hence, the welding can be performed using laser light with lower energy than that of laser light used in the case where the glass frit layer 510 is directly irradiated with the laser light. When the metal is used for the buffer layer 150, since the heat conductivity of the metal is higher than that of an insulator, heat generated by absorption of the laser light 800 can be conducted to the glass frit layer 510 more efficiently than when an insulator is used. Accordingly, the welding can be performed using laser light with lower energy. In addition, a laser absorbent material does not need to be added to the glass frit paste 500. Accordingly, the material costs of the glass frit paste 500 can be suppressed.

(Embodiment 5)

Figure 12A:
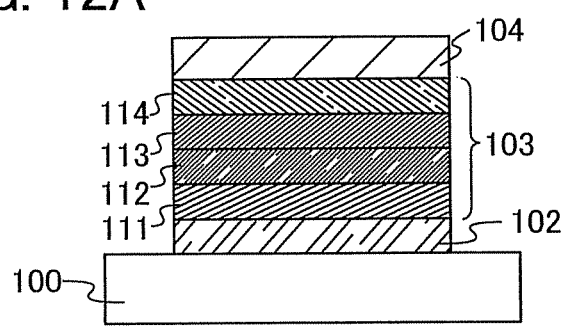
FIGS. 12A and 12B are each a conceptual diagram of a light-emitting element according to one embodiment of the present invention.

One structural mode applicable to the organic EL element 125 described in Embodiments 3 and 4 is described with reference to FIG. 12A. Note that in this embodiment, a structure of a light-emitting element including an organic EL layer 103 provided between a first electrode 102 and a second electrode 104 is described in detail. The terminal 126b is connected to the first electrode 102 and the terminal 126a is connected to the second electrode 104.

The light-emitting element includes a pair of electrodes (the first electrode 102 and the second electrode 104) and the organic EL layer 103 provided between the pair of electrodes. The light-emitting element described in this embodiment is provided over a glass substrate 100.

The glass substrate 100 is used as a support of the light-emitting element. As the glass substrate 100, it is needless to say that a rectangular plate-like substrate can be used, and substrates having any of a variety of shapes, such as a shape having a curved surface, can be used.

One of the first electrode 102 and the second electrode 104 serves as an anode and the other serves as a cathode. In this embodiment, the first electrode 102 is used as the anode and the second electrode 104 is used as the cathode; however, the present invention is not limited to this structure.

As a material for the anode, any of metals, alloys, electrically conductive compounds, and mixtures thereof which have a high work function (specifically, a work function of 4.0 eV or more) or the like is preferably used. Specific examples are indium oxide-tin oxide (ITO: indium tin oxide), indium oxide-tin oxide containing silicon or silicon oxide, indium oxide-zinc oxide (indium zinc oxide), indium oxide containing tungsten oxide and zinc oxide (IWZO), and the like. Other examples are gold (Au), platinum (Pt), nickel (Ni), tungsten (W), chromium (Cr), molybdenum (Mo), iron (Fe), cobalt (Co), copper (Cu), palladium (Pd), a nitride of a metal material (such as titanium nitride), and the like.

As a material for the cathode, any of metals, alloys, electrically conductive compounds, and mixtures thereof which have a low work function (specifically, a work function of 3.8 eV or less) or the like is preferably used. Specifically, an element belonging to Group 1 or Group 2 of the periodic table, that is, an alkali metal such as lithium (Li) and cesium (Cs), an alkaline earth metal such as calcium (Ca) and strontium (Sr), and magnesium (Mg) can be given. Further, an alloy containing an alkali metal or an alkaline earth metal (e.g., MgAg or AlLi) can be used. Moreover, a rare earth metal such as europium (Eu) or ytterbium (Yb), or an alloy containing a rare earth metal can also be used. In the case where an electron-injection layer in contact with the second electrode 104 is provided as part of the organic EL layer 103, the second electrode 104 can be formed using a variety of conductive materials such as Al, Ag, or ITO, regardless of their work functions. Thin films of these electrically conductive materials can be formed by a sputtering method, an inkjet method, a spin coating method, or the like.

Although the organic EL layer 103 can be formed to have a single-layer structure, it is normally formed to have a stacked-layer structure. There is no particular limitation on the stacked-layer structure of the organic EL layer 103. The organic EL layer 103 may be formed by combining, as appropriate, a layer containing a substance having a high electron-transport property (electron-transport layer) or a layer containing a substance having a high hole-transport property (hole-transport layer), a layer containing a substance having a high electron-injection property (electron-injection layer), a layer containing a substance having a high hole-injection property (hole-injection layer), a layer containing a bipolar substance (substance having high electron- and hole-transport properties), a layer containing a light-emitting material (light-emitting layer), and the like. For example, the organic EL layer 103 can be formed in an appropriate combination of a hole-injection layer, a hole-transport layer, a light-emitting layer, an electron-transport layer, an electron-injection layer, and the like. FIG. 12A illustrates, as the organic EL layer 103 formed over the first electrode 102, a structure in which a hole-injection layer 111, a hole-transport layer 112, a light-emitting layer 113, and an electron-transport layer 114 are sequentially stacked.

The light-emitting element emits light, when current flows due to a potential difference generated between the first electrode 102 and the second electrode 104 and holes and electrons recombine in the light-emitting layer 113 containing a substance having a high light-emitting property. That is, a light-emitting region is formed in the light-emitting layer 113.

Light emission is extracted out through one or both of the first electrode 102 and the second electrode 104. Therefore, one or both of the first electrode 102 and the second electrode 104 have a light-transmitting property. In the case where only the first electrode 102 has a light-transmitting property, light emission is extracted by passing through the first electrode 102 in the direction of the glass substrate 100. Meanwhile, in the case where only the second electrode 104 has a light-transmitting property, light emission is extracted by passing through the second electrode 104 in the opposite direction of the substrate. In the case where each of the first electrode 102 and the second electrode 104 has a light-transmitting property, light emission is extracted by passing through the first electrode 102 and the second electrode 104 both in the direction of the glass substrate 100 and in the opposite direction.

In order that energy transfer from an exciton generated in the light-emitting layer 113 can be suppressed, the hole-transport layer 112 or the electron-transport layer 114 in contact with the light-emitting layer 113, which is particularly a carrier-(electron- or hole-) transport layer in contact with the light-emitting layer 113 on the side closer to a light-emitting region in the light-emitting layer 113, preferably includes a substance having an energy gap larger than that of a light-emitting material in the light-emitting layer or that of an emission center substance in the light-emitting layer.

The hole-injection layer 111 includes a substance having a high hole-injection property, and has a function of helping injection of holes from the first electrode 102 to the hole-transport: layer 112. For the hole-injection layer 111, a substance which reduces a difference in ionization potential between the first electrode 102 and the hole-transport layer 112 and thus makes hole injection easy, is selected. For the hole-injection layer 111, a substance having an ionization potential which is lower than that of the hole-transport layer 112 and higher than that of the first electrode 102 is preferred. For example, phthalocyanine (abbreviation: $H_2Pc$), a phthalocyanine-based compound such as copper phthalocyanine (abbreviation: CuPc), or a high molecular compound such as poly(ethylenedioxythiophene)/poly(styrenesulfonate) aqueous solution (PEDOT/PSS) can be used.

The hole-transport layer 112 is a layer containing a substance having a high hole-transport property. Note that a substance having a high hole-transport property means a substance having higher hole mobility than electron mobility, and the ratio of hole mobility to electron mobility in the substance (=hole mobility/electron mobility) is preferably more than 100. The hole-transport layer 112 preferably has a hole mobility of $1\times10^{-6}$ cm$^2$/Vs or more. Specific examples of substances having a high hole-transport property include 4,4'-bis[N-(1-naphthyl)-N-phenylamino]biphenyl (abbreviation: NPB), 4,4'-bis[N-(3-methylphenyl)-N-phenylamino]biphenyl (abbreviation: TPD), 4,4',4"-tris(N,N-diphenylamino)triphenylamine (abbreviation: TDATA), 4,4',4"-tris[N-(3-methylphenyl)-N-phenylamino]triphenylamine (abbreviation: MTDATA), (abbreviation: DNTPD), 1,3,5-tris[N,N-di(m-tolyl)amino]benzene (abbreviation: m-MTDAB), 4,4',4"-tris(N-carbazolyl)triphenylamine (abbreviation: TCTA), phthalocyanine (abbreviation: $H_2Pc$), copper phthalocyanine (abbreviation: CuPc), vanadyl phthalocyanine (abbreviation: VOPc), and the like. The hole-transport layer 112 may have a single-layer structure or a stacked-layer structure.

The electron-transport layer 114 is a layer containing a substance having a high electron-transport property. Note that a substance having a high electron-transport property means a substance having higher electron mobility than hole mobility, and the ratio of electron mobility to hole mobility (=electron mobility/hole mobility) in the substance is preferably more than 100. The electron-transport layer 114 preferably has an electron mobility of $1\times10^{-6}$ cm$^2$/Vs or more. Specific examples of substances having a high electron-transport property include a metal complex having a quinoline skeleton, a metal complex having a benzoquinoline skeleton, a metal complex having an oxazole-based ligand, and a metal complex having a thiazole-based ligand. Specific examples of metal complexes having a quinoline skeleton include tris(8-quinolinolato)aluminum (abbreviation: Alq$_3$), tris(4-methyl-8-quinolinolato)aluminum (abbreviation: Almq$_3$), and bis(2-methyl-8-quinolinolato)(4-phenylphenolato)aluminum (abbreviation: BAlq). A specific example of a metal complex having a benzoquinoline skeleton is bis(10-hydroxybenzo[h]quinolinato)beryllium (abbreviation: BeBq$_2$). A specific example of a metal complex having an oxazole-based ligand is bis[2-(2-hydroxyphenyl)benzoxazolato]zinc (abbreviation: Zn(BOX)$_2$). A specific example of a metal complex having a thiazole-based ligand is bis[2-(2-hydroxyphenyl)benzothiazolato]zinc (abbreviation: Zn(BTZ)$_2$). Other than the metal complexes, 2-(4-biphenylyl)-5-(4-tert-butylphenyl)-1,3,4-oxadiazole (abbreviation: PBD), 1,3-bis[5-(p-tert-butylphenyl)-1,3,4-oxadiazol-2-yl]benzene (abbreviation: OXD-7), 3-(4-biphenylyl)-4-phenyl-5-(4-tert-butylphenyl)-1,2,4-triazole (abbreviation: TAZ 01), bathophenanthroline (abbreviation: BPhen), bathocuproine (abbreviation: BCP), or the like can be used. The substances specifically listed above are mainly substances having an electron mobility of $10^{-6}$ cm$^2$/Vs or more. Note that other than these substances, a substance that has a property of transporting more electrons than holes may be used for the electron-transport layer 114. Further, the electron-transport layer 114 may have a single-layer structure or a stacked-layer structure.

Further, a layer for controlling transport of electron carriers may be provided between the light-emitting layer 113 and the electron-transport layer 114. The layer for controlling transport of electron carriers is a layer obtained by slight addition of a substance having a high electron-trapping property to the above-described material having a high electron-transport property. By providing the layer for controlling transport of electron carriers, it is possible to suppress transfer of electron carriers and to adjust carrier balance. Such a structure is very effective in suppressing a problem (such as shortening of element lifetime) caused when electrons pass through the light-emitting layer.

In addition, an electron-injection layer may be provided between the electron-transport layer 114 and the second electrode 104 and in contact with the second electrode 104. As the electron-injection layer, a layer which includes a substance having an electron-transport property and an alkali metal, an alkaline earth metal, or a compound thereof such as lithium fluoride (LiF), cesium fluoride (CsF), or calcium fluoride (CaF$_2$) may be used. Specifically, a layer containing Alq and magnesium (Mg) can be used. By providing the electron-injection layer, electrons can be efficiently injected from the second electrode 104.

Various methods can be used for forming the organic EL layer 103 regardless of a dry method or a wet method. For example, a vacuum evaporation method, an inkjet method, or a spin coating method can be used. In the case where the organic EL layer 103 has a stacked-layer structure, formation methods of the layers may be different or the same.

Further, the first electrode 102 and the second electrode 104 may be formed by a wet process using a sol-gel method, or a wet method using a liquid metal material. Further, the first electrode 102 and the second electrode 104 may be formed by a dry process such as a sputtering method or a vacuum evaporation method. By combining such a light-emitting element and a method of manufacturing a sealed structure according to one embodiment of the present invention, a highly reliable light-emitting device can be manufactured.

The methods and the like described in this embodiment can be combined as appropriate with any of the methods and the like described in the other embodiments.

(Embodiment 6)

In this embodiment is described a light-emitting element in which a plurality of light-emitting units is stacked (this light-emitting element is hereinafter referred to as "tandem light-emitting element") and which is sealed using a method of manufacturing a sealed structure according to one embodiment of the present invention, with reference to FIG. 12B. The tandem light-emitting element is a light-emitting element having a plurality of light-emitting units between a first electrode and a second electrode. The structure of the light-emitting units can be similar to that of the above-described organic EL layer 103.

Figure 12B:
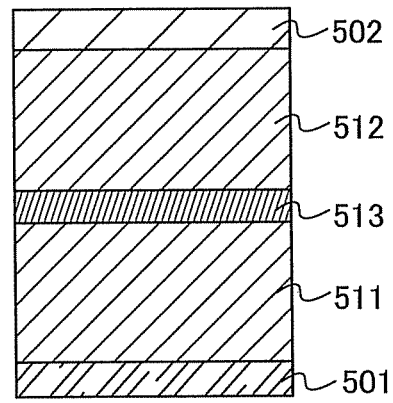

In FIG. 12B, a first light-emitting unit 511 and a second light-emitting unit 512 are stacked between the first electrode 501 and the second electrode 502. Electrodes similar to those described in Embodiment 5 can be used as the first electrode 501 and the second electrode 502. Further, the structures of the first light-emitting unit 511 and the second light-emitting unit 512 may be the same or different from each other, and each of the structures can be similar to the structure described in Embodiment 5.

A charge generation layer 513 is provided between the first light-emitting unit 511 and the second light-emitting unit 512. The charge generation layer 513 contains a composite material of an organic compound and a metal oxide and has a function of injecting electrons to one side of the light-emitting units, and holes to the other side of the light-emitting units when a voltage is applied between the first electrode 501 and the second electrode 502. The composite material of an organic compound and a metal oxide enables low-voltage driving and low-current driving because it has an excellent carrier-injection property and an excellent carrier-transport property.

As the organic compound, an organic compound which has a hole-transport property and has a hole mobility of $10^{-6}$ cm$^2$/Vs or more is preferably used; specifically, any of aromatic amine compounds, carbazole compounds, aromatic hydrocarbons, and high molecular compounds (e.g., oligomers and dendrimers), and the like can be used. As the metal oxide mixed with the organic compound, an oxide of a metal belonging to any of Groups 4 to 8 in the periodic table is preferably used; specifically, vanadium oxide, niobium oxide, tantalum oxide, chromium oxide, molybdenum oxide, tungsten oxide, manganese oxide, and rhenium oxide are preferred because their electron-accepting property is high. In particular, molybdenum oxide is preferred because it is stable in the air, has a low hygroscopic property, and is easily handled.

The charge generation layer 513 may have a single-layer structure or a stacked-layer structure. For example, the charge generation layer 513 may have a structure in which a layer containing the composite material of an organic compound and a metal oxide and a layer containing one compound selected from electron-donating substances and a compound having a high electron-transport property are stacked, or a structure in which a layer containing the composite material of an organic compound and a metal oxide and a transparent conductive film are stacked.

In this embodiment, the light-emitting element having two light-emitting units is described; however, the present invention is not limited to this structure. That is; a tandem light-emitting element may have three or more light-emitting units. Also in that case, a charge generation layer is provided between the light-emitting units. For example, it is also possible to form a light-emitting element having a first unit, a second unit formed using a first light-emitting material which emits light with a longer wavelength than that of light emitted from the first unit (e.g., red light), and a third unit formed using a second light-emitting material which emits light with a longer wavelength than that of light emitted from the first unit and a shorter wavelength than that of light emitted by the first light-emitting material (e.g., green light). By using these light-emitting units, a light-emitting device which provides white light emission can be realized.

A plurality of light-emitting units partitioned by a charge generation layer is arranged between a pair of electrodes in the tandem light-emitting element of this embodiment, and hence the tandem light-emitting element can emit light with high luminance while the current density is kept low. Since the current density can be low, the light-emitting element can achieve high luminance and a long lifetime. By combining such a light-emitting element and a method of manufacturing a sealed structure according to one embodiment of the present invention, a highly reliable light-emitting device can be manufactured.

The methods and the like described in this embodiment can be combined as appropriate with any of the methods and the like described in the other embodiments.

(Embodiment 7)

In this embodiment, a passive matrix light-emitting device and an active matrix light-emitting device each of which is sealed using a method of manufacturing a sealed structure according to one embodiment of the present invention are described.

FIGS. 13A to 13D and FIG. 14 illustrate examples of passive-matrix light-emitting devices.

In a passive-matrix (also called simple-matrix) light-emitting device, a plurality of anodes arranged in stripes (in stripe form) is provided so as to be perpendicular to a plurality of cathodes arranged in stripes. At their intersections, a light-emitting layer is interposed. Therefore, a pixel at an intersection of an anode selected (to which a voltage is applied) and a cathode selected emits light.

Figure 13A:
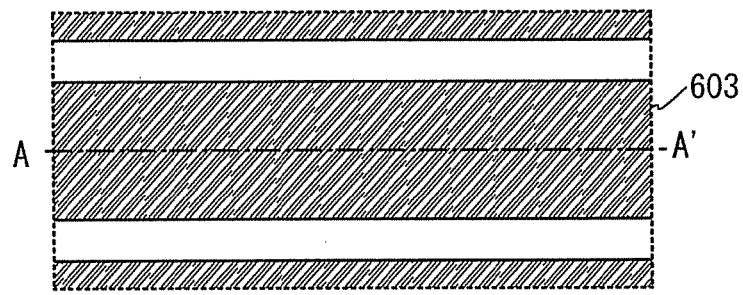
FIGS. 13A to 13D illustrate an example of a light-emitting device according to one embodiment of the present invention.
Figure 13B:
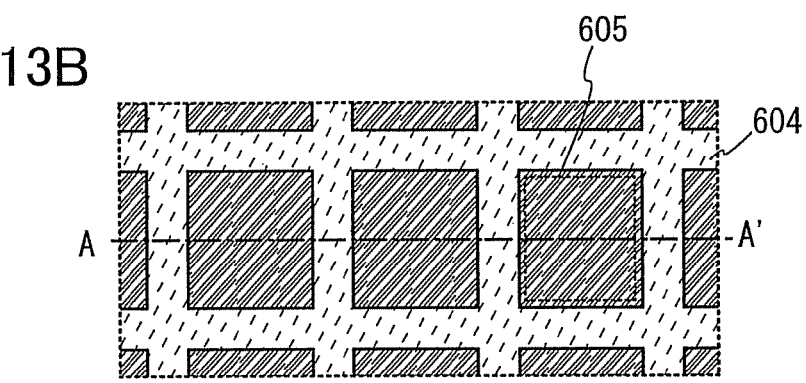
Figure 13C:
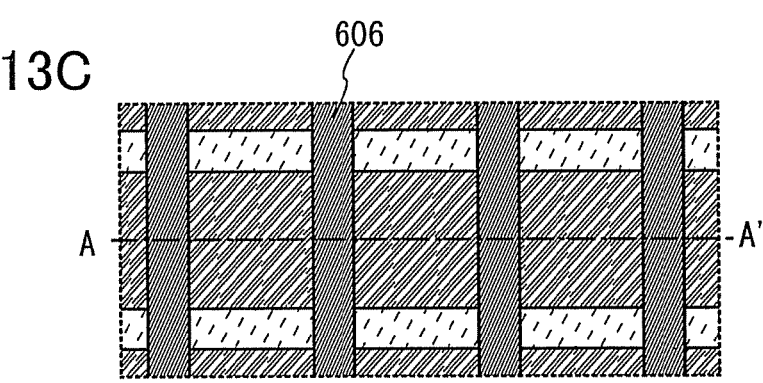
Figure 13D:
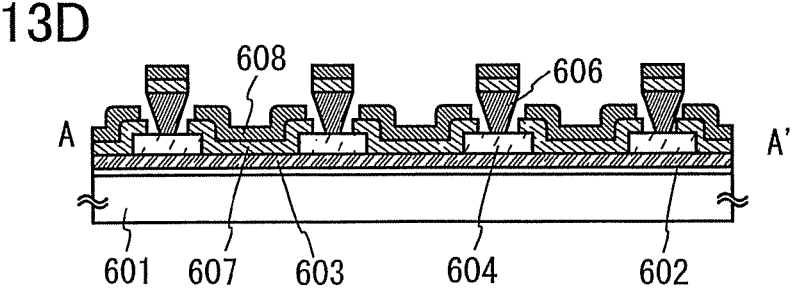

FIGS. 13A to 13C are plan views of a pixel portion before sealing, and FIG. 13D is a cross-sectional view taken along the chain line A-A' in FIGS. 13A to 13C.

Over a glass substrate 601, an insulating layer 602 is formed as a base insulating layer. Note that the insulating layer 602 may be omitted when unnecessary. Over the insulating layer 602, a plurality of first electrodes 603 is arranged in stripes at regular intervals (FIG. 13A). Note that each of the first electrodes 603 in this embodiment corresponds to the first electrode 102 in Embodiment 5.

In addition, a partition 604 having openings 605 each corresponding to a pixel is provided over the first electrodes 603. The partition 604 is formed with an insulating material. As the insulating material, polyimide, acrylic, polyamide, polyimide amide, a photosensitive or non-photosensitive organic material such as benzocyclobutene, or an SOG film such as an SiOx film that contains an alkyl group can be used, for example. Note that the openings 605 each corresponding to a pixel serve as light-emitting regions (FIG. 13B).

Over the partition 604 having the openings, a plurality of partitions 606 intersecting with the first electrodes 603 is provided (FIG. 13C). The plurality of partitions 606 is formed in parallel to each other, and reversely tapered.

Over the first electrodes 603 and the partition 604, an organic EL layer 607 and a second electrode 608 are sequentially stacked (FIG. 13D). Note that the organic EL layer 607 in this embodiment corresponds to the organic EL layer 103 in Embodiment 5, and the second electrode 608 in this embodiment corresponds to the second electrode 104 in Embodiment 5. The total height of the partition 604 and the partition 606 is set to exceed the total thickness of the organic EL layer 607 and the second electrode 608; consequently, the organic EL layer 607 and the second electrode 608 are divided into a plurality of regions as illustrated in FIG. 13D. Note that the plurality of divided regions is electrically isolated from each other.

The second electrode 608 is formed in stripes to intersect with the first electrode 603. Note that when the organic EL layer 607 and the second electrode 608 are formed, layers similar thereto are also formed over the reversely-tapered partitions 606; however, the layers are separated from the organic EL layer 607 and the second electrode 608.

Next, based on the glass substrate 601, a glass sealed structure is formed as described in Embodiment 3. Accordingly, deterioration of a light-emitting element can be significantly suppressed. Note that the hermetically sealed space may be filled with a dry filler or a dry inert gas. In addition, a drying agent or the like may be put in the glass sealed structure so that deterioration of a light-emitting element due to moisture or the like can be prevented. The drying agent removes a minute amount of moisture, thereby achieving sufficient drying. As the drying agent, oxide of an alkaline earth metal such as calcium oxide or barium oxide, zeolite, silica gel, or the like can be used. Oxide of an alkaline earth metal adsorbs moisture by chemical adsorption, and zeolite and silica gel adsorb moisture by physical adsorption.

Figure 14:
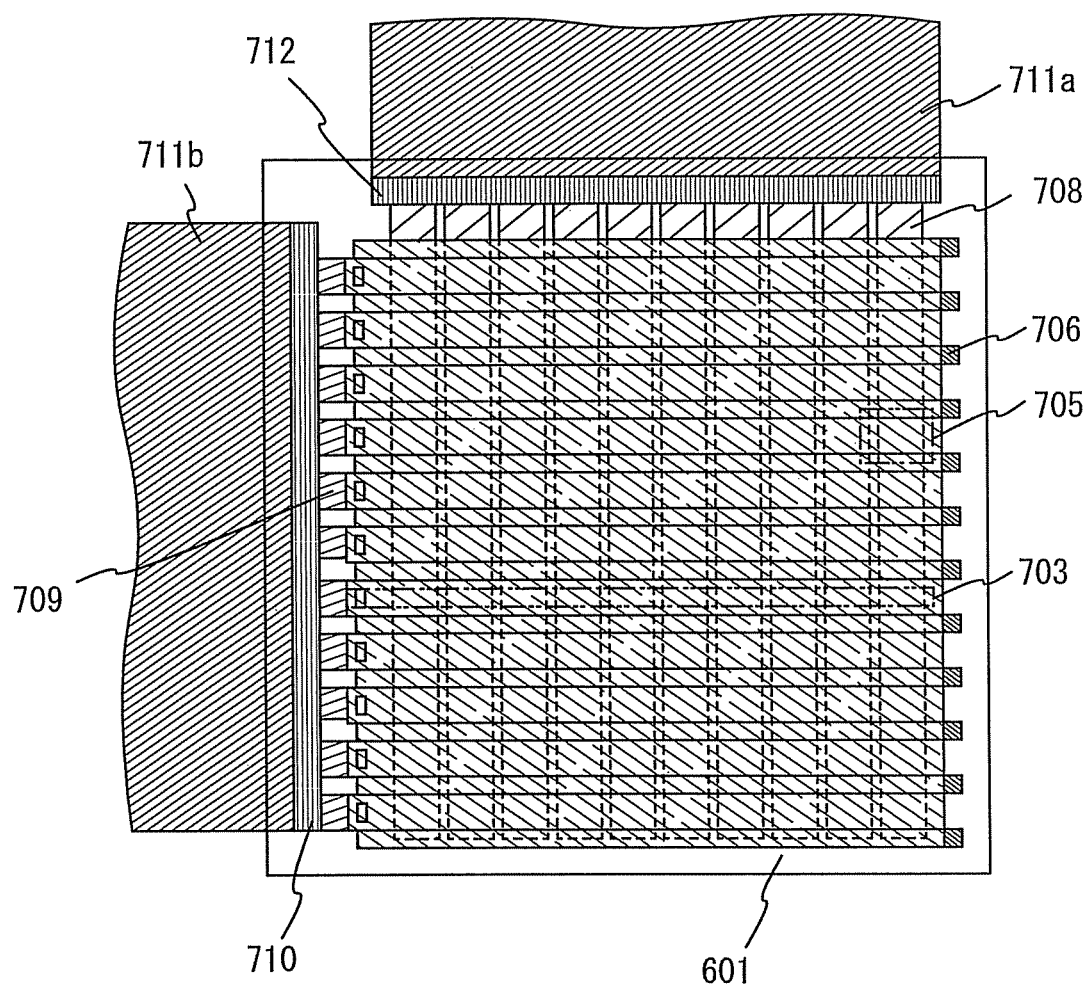
FIG. 14 illustrates an example of a light-emitting device according to one embodiment of the present invention.

FIG. 14 is a plan view of a passive-matrix light-emitting device which has a structure illustrated in FIGS. 13A to 13D and which is provided with a flexible printed circuit (FPC) or the like.

In FIG. 14, scan lines and data lines perpendicularly intersect with each other in a pixel portion for displaying images.

Here, the first electrode 603, the second electrode 608, and the reversely-tapered partition 606 in FIGS. 13A to 13D respectively correspond to a scan line 703, a data line 708, and a partition 706 in FIG. 14. The EL layers 607 illustrated in FIGS. 13A to 13D are interposed between the data lines 708 and the scanning lines 703, and an intersection indicated by a region 705 corresponds to one pixel.

The scan lines 703 are electrically connected at their ends to connection wirings 709, and the connection wirings 709 are connected to an FPC 711b through an input terminal 710. In addition, the data lines 708 are connected to an FPC 711a through an input terminal 712. The data line 708 and the connection wiring 709 respectively correspond to the terminals 126a and 126b in FIG. 7. The glass frit layer 510 is formed so as to cross the data lines 708 and the connection wirings 709.

An optical film such as a polarizing plate, a circularly polarizing plate (including an elliptically polarizing plate), a retardation plate (a quarter-wave plate or a half-wave plate), or a color filter may be provided as needed on a surface through which light is emitted. Further, in addition to the polarizing plate or the circularly polarizing plate, an anti-reflection film may be provided so that reflection of external light can be suppressed. Alternatively, projections and/or depressions may be provided on a surface through which light is emitted so as to diffuse reflected light, whereby reflection of external light to the surface can be suppressed.

Although FIG. 14 illustrates an example in which a driver circuit is not provided over a substrate, an IC chip including a driver circuit may be provided over a substrate.

In the case where the IC chip is used, a data line side IC and a scanning line side IC, in each of which the driver circuit for transmitting a signal to a pixel portion is formed, are mounted on the periphery of (outside) the pixel portion. As a method of mounting an IC chip, a COG method, a TCP, a wire bonding method, or the like can be used. The TCP is obtained by mounting an IC on a TAB tape, in which the IC is mounted by connecting the TAB tape to a wiring over an element formation substrate. The data line side IC and the scan line side IC may be formed using a silicon substrate or a silicon on insulator (SOI) substrate, or may be formed over a glass substrate, a quartz substrate, or a plastic substrate.

Figure 15A:
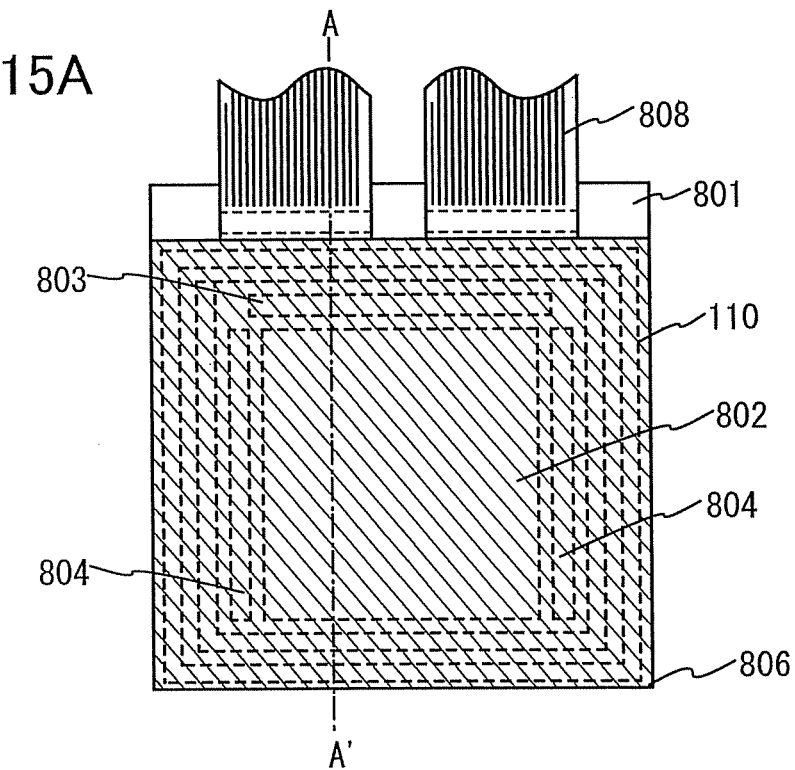
FIGS. 15A and 15B illustrate an example of a light-emitting device according to one embodiment of the present invention.
Figure 15B:
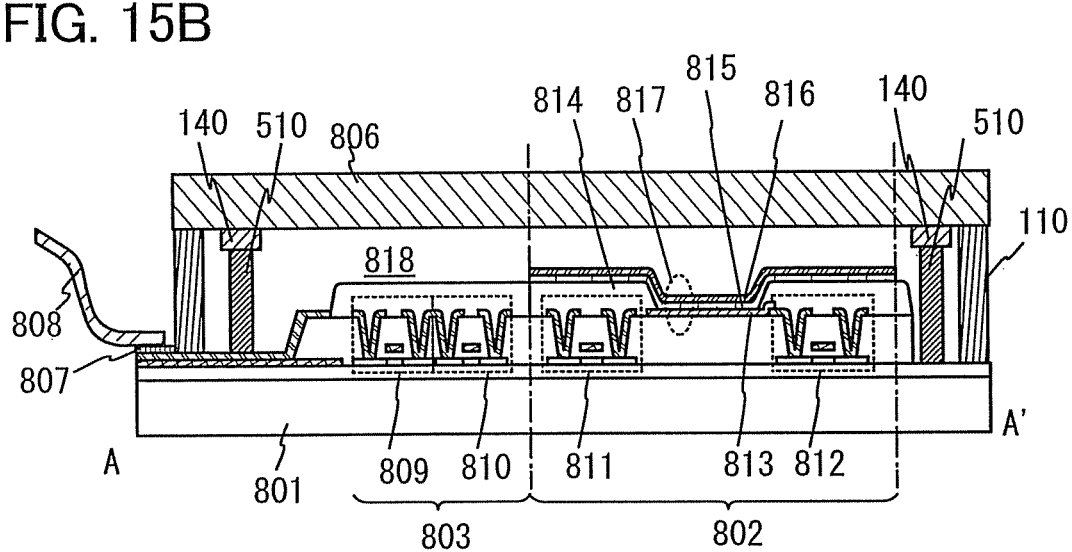

Next, an example of an active matrix light-emitting device is described with reference to FIGS. 15A and 15B. Note that FIG. 15A is a plan view of the light-emitting device and FIG. 15B is a cross-sectional view taken along the chain line A-A' in FIG. 15A. The active-matrix light-emitting device of this embodiment includes a pixel portion 802 provided over a glass substrate 801, a driver circuit portion (source-side driver circuit) 803, and a driver circuit portion (gate-side driver circuit) 804. The pixel portion 802, the driver circuit portion 803, and the driver circuit portion 804 are sealed in a sealed structure formed with the glass frit layer 510, the glass substrate 801, and a glass substrate 806.

Over the glass substrate 801, a lead wiring 807 for connecting an external input terminal through which a signal (e.g., a video signal, a clock signal, a start signal, a reset signal, or the like) or a potential from the outside is transmitted to the driver circuit portion 803 and the driver circuit portion 804 is provided. Here, an example is described in which a FPC 808 is provided as the external input terminal. Note that although only the FPC is illustrated here, a printed wiring board (PWB) may be attached thereto. In this specification, the light-emitting device includes in its category the light-emitting device itself and the light-emitting device on which the FPC or the PWB is mounted.

Next, a cross-sectional structure of the active-matrix light-emitting device is described with reference to FIG. 15B. Although the driver circuit portion 803, the driver circuit portion 804, and the pixel portion 802 are formed over the glass substrate 801, FIG. 15B illustrates the pixel portion 802 and the driver circuit portion 803 which is the source side driver circuit.

An example in which the driver circuit portion 803 includes a CMOS circuit which is a combination of an n-channel TFT 809 and a p-channel TFT 810 is illustrated. Note that the driver circuit portion can be formed using various types of circuits such as a CMOS circuit, a PMOS circuit, or an NMOS circuit. In this embodiment, a driver-integrated type in which the pixel portion and a driver circuit are formed over the same substrate is described; however, the present invention is not limited to this structure, and a driver circuit can be formed over a substrate that is different from the substrate over which a pixel portion is formed.

The pixel portion 802 has a plurality of pixels, each including a switching TFT 811, a current-controlling TFT 812, and an anode 813 electrically connected to a wiring (a source electrode or a drain electrode) of the current-controlling TFT 812. An insulator 814 is formed so as to cover an end portion of the anode 813. Here, the insulator 814 is formed using a positive photosensitive acrylic resin. Note that there is no particular limitation on structures of the TFTs such as the switching TFT 811 and the current-controlling TFT 812. For example, a staggered TFT or an inverted-staggered TFT may be used. A top-gate TFT or a bottom-gate TFT may also be used. There is no particular limitation also on materials of a semiconductor used for the TFTs, and silicon or an oxide semiconductor such as oxide containing indium, gallium, and zinc may be used. In addition, the crystallinity of a semiconductor used for the TFT is not particularly limited either; an amorphous semiconductor or a crystalline semiconductor may be used.

A light-emitting element 817 includes an anode 813, an organic EL layer 815, and a cathode 816. The structure, the material, and the like of the light-emitting element are as described above. Note that the anode 813, the organic EL layer 815, and the cathode 816 in FIGS. 15A and 15B correspond to the first electrode 102, the organic EL layer 103, and the second electrode 104 in Embodiment 5, respectively. Although not illustrated, the cathode 816 is electrically connected to the FPC 808 which is an external input terminal.

The insulator 814 is provided at an end portion of the anode 813. Further, in order that the cathode 816 formed over the insulator 814 can favorably cover the insulator 814, a corner portion of the insulator 814 is preferably rounded. For example, the corner portion of the insulator 814 preferably has a curved surface with a radius of curvature of 0.2 µm to 3 µm. The insulator 814 can be formed using an organic compound such as a negative photosensitive resin which becomes insoluble in an etchant when irradiated with light or a positive photosensitive resin which becomes soluble in an etchant when irradiated with light, or an inorganic compound such as silicon oxide or silicon oxynitride can be used.

Although the cross-sectional view of FIG. 15B illustrates only one light-emitting element 817, a plurality of light-emitting elements is arranged in matrix in the pixel portion 802. For example, light-emitting elements that emit light of three colors (R, G, and B) are formed in the pixel portion 802, so that a light-emitting device capable of full color display can be obtained. Alternatively, a light-emitting device capable of full color display may be obtained by a combination of the light-emitting device which provides white light emission described in the above embodiment and a color filter. Further, any of a bottom emission structure, a top emission structure, and a dual emission structure can be applied to the light-emitting element.

The light-emitting element 817 is provided in a sealed structure 818 that is surrounded by the glass substrate 801, the glass substrate 806, and the glass frit layer 510. The sealed structure 818 may be filled with a rare gas, a nitrogen gas, or a solid.

As described above, the active matrix light-emitting device sealed using a method of manufacturing a sealed structure according to one embodiment of the present invention can be obtained. Such a light-emitting device has high reliability.

The methods and the like described in this embodiment can be combined as appropriate with any of the methods and the like described in the other embodiments.

(Embodiment 8)

In this embodiment are described specific examples of electronic devices using a light-emitting device manufactured using the method of manufacturing a light-emitting device described in the above embodiments and lighting devices using the light-emitting device, with reference to FIGS. 16A to 16E and FIG. 17.

Examples of electronic devices to which the present invention can be applied are television devices (also referred to as TV or television receivers), monitors for computers and the like, cameras such as digital cameras and digital video cameras, digital photo frames, mobile phones, portable game machines, portable information terminals, audio playback devices, game machines (e.g., pachinko machines and slot machines), games consoles, and the like. Some specific examples of these electronic devices and lighting devices are illustrated in FIGS. 16A to 16E and FIG. 17.

Figure 16A:
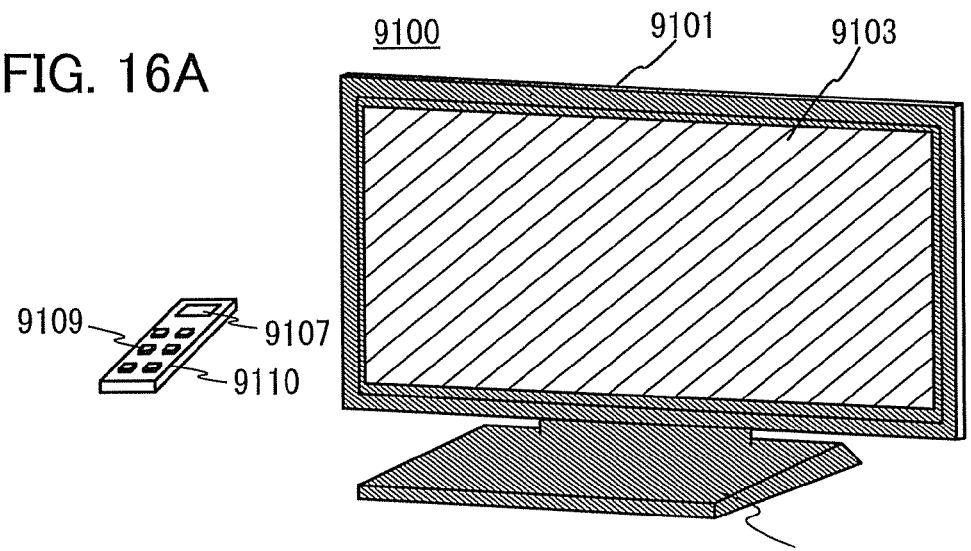
FIGS. 16A to 16E illustrate examples of electronic devices and a lighting device according to one embodiment of the present invention.

FIG. 16A illustrates a television device 9100. In the television device 9100, a display portion 9103 is incorporated in a housing 9101. A light-emitting device manufactured using one embodiment of the present invention can be used in the display portion 9103, so that an image can be displayed on the display portion 9103. Note that here, the housing 9101 is supported by a stand 9105.

The television device 9100 can be operated with an operation switch of the housing 9101 or a separate remote controller 9110. Channels and volume can be controlled with an operation key 9109 of the remote controller 9110 so that an image displayed on the display portion 9103 can be controlled. Furthermore, the remote controller 9110 may be provided with a display portion 9107 for displaying data output from the remote controller 9110.

The television device 9100 illustrated in FIG. 16A is provided with a receiver, a modem, and the like. With the receiver, the television device 9100 can receive a general television broadcast. Further, when the television device 9100 is connected to a communication network by wired or wireless connection via the modem, one-way (from a transmitter to a receiver) or two-way (between a transmitter and a receiver or between receivers) data communication can be performed.

The light-emitting device sealed using the glass frit layer 510, which is described in the above embodiments, is employed, whereby a light-emitting element is less likely to deteriorate. Hence, by using the light-emitting device for the display portion 9103 of the television device, the television device can have higher durability and a longer lifetime than a conventional television device.

Figure 16B:
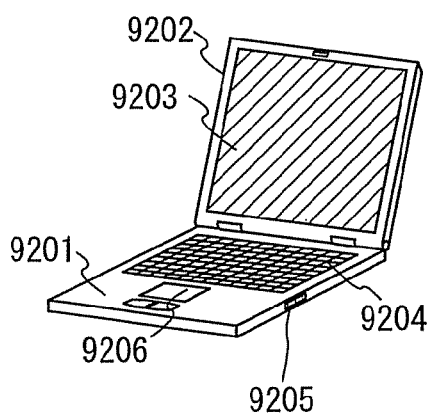

FIG. 16B illustrates a computer which includes a main body 9201, a housing 9202, a display portion 9203, a keyboard 9204, an external connection port 9205, a pointing device 9206, and the like. The computer includes a light-emitting device manufactured using one embodiment of the present invention as the display portion 9203.

Further, the light-emitting device sealed using the glass frit layer 510, which is described in the above embodiments, is employed, whereby a light-emitting element is less likely to deteriorate. Hence, by using the light-emitting device for the display portion 9203 of the computer, the display portion can have higher durability and a longer lifetime than a conventional display portion.

Figure 16C:
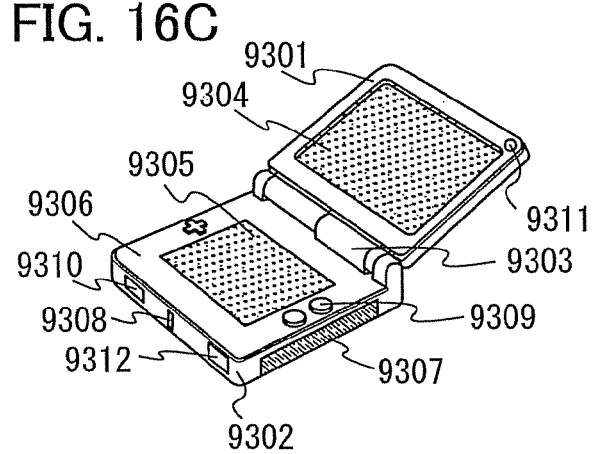

FIG. 16C illustrates a portable game machine including two housings, a housing 9301 and a housing 9302 which are jointed with a connector 9303 so as to be opened and closed. A display portion 9304 is incorporated in the housing 9301, and a display portion 9305 is incorporated in the housing 9302. In addition, the portable game machine illustrated in FIG. 16C includes an input means such as operation keys 9309, a connection terminal 9310, a sensor 9311 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), or a microphone 9312. The portable game machine may further be provided with a speaker portion 9306, a recording medium insertion portion 9307, an LED lamp 9308, and the like. Needless to say, the structure of the portable game machine is not limited to the above, and it is acceptable as long as the light-emitting device manufactured using any of the above embodiments is used for one or both of the display portion 9304 and the display portion 9305.

The portable game machine illustrated in FIG. 16C has a function of reading a program or data stored in a recording medium to display it on the display portion, and a function of sharing information with another portable game machine by wireless communication. Note that a function of the portable game machine illustrated in FIG. 16C is not limited to the above, and the portable game machine can have a variety of functions.

Further, the light-emitting device sealed using the glass frit layer 510, which is described in the above embodiments, is employed, whereby a light-emitting element is less likely to deteriorate. Hence, by using the light-emitting device for the display portions 9304 and 9305 of the portable game machine, the portable game machine can have higher durability and a longer lifetime than a conventional portable game machine.

Figure 16D:
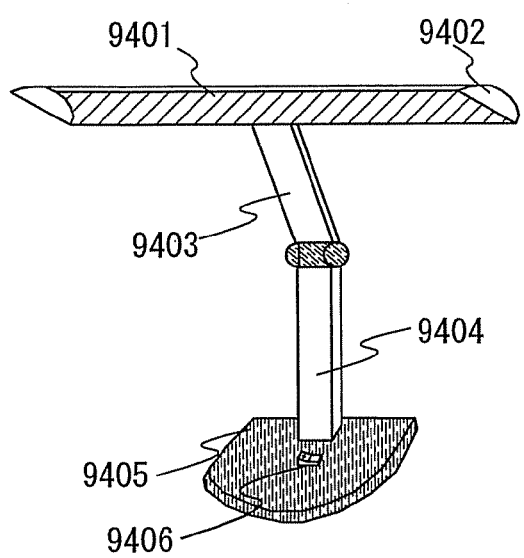
Figure 16E:
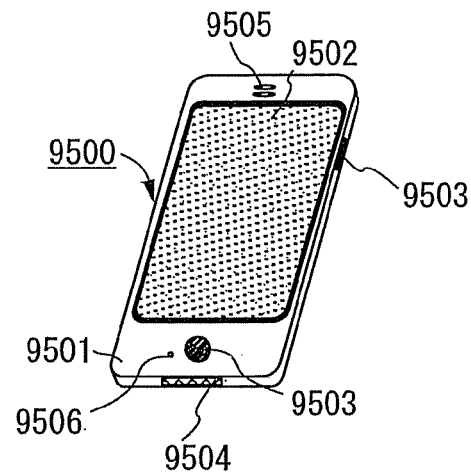

FIG. 16E illustrates an example of a mobile phone. A mobile phone 9500 is provided with a display portion 9502 incorporated in a housing 9501, an operation button 9503, an external connection port 9504, a speaker 9505, a microphone 9506, and the like. The mobile phone 9500 includes a light-emitting device manufactured using one embodiment of the present invention as the display portion 9502.

Users can input data, make a call, or create mail by touching the display portion 9502 of the mobile phone 9500 illustrated in FIG. 16E with their fingers or the like.

There are mainly three screen modes for the display portion 9502. The first mode is a display mode mainly for displaying images. The second mode is an input mode mainly for inputting data of a character and the like. The third mode is a display-and-input mode in which two modes of the display mode and the input mode are combined.

For example, in the case of making a call or creating mail, an input mode mainly for inputting a character is selected for the display portion 9502 so that a character displayed on a screen can be input. In this case, it is preferable to display a keyboard or number buttons on almost the entire screen of the display portion 9502.

By providing a detection device which includes a sensor for detecting inclination, such as a gyroscope or an acceleration sensor, inside the mobile phone 9500, the direction of the mobile phone 9500 (whether the mobile phone 9500 is placed horizontally or vertically for a landscape mode or a portrait mode) is determined so that display on the screen of the display portion 9502 can be automatically switched.

In addition, the screen modes are switched by touching the display portion 9502 or operating the operation button 9503 of the housing 9501. Alternatively, the screen modes can be switched depending on kinds of images displayed in the display portion 9502. For example, when a signal of an image displayed on the display portion is a signal of moving image data, the screen mode is switched to the display mode. When the signal is a signal of text data, the screen mode is switched to the input mode.

Moreover, in the input mode, when input by touching the display portion 9502 is not performed within a specified period of time while a signal detected by an optical sensor in the display portion 9502 is detected, the screen mode may be controlled so as to be switched from the input mode to the display mode.

The display portion 9502 can also function as an image sensor. For example, an image of a palm print, a fingerprint, or the like is taken by touching the display portion 9502 with the palm or the finger, whereby personal authentication can be performed. Further, by providing a backlight or a sensing light source which emits a near-infrared light in the display portion, an image of a finger vein, a palm vein, or the like can be taken.

Further, the light-emitting device sealed using the glass frit layer 510, which is described in the above embodiments, is employed, whereby a light-emitting element is less likely to deteriorate. Hence, by using the light-emitting device for the display portion 9502 of the mobile phone, the mobile phone can have higher durability and a longer lifetime than a conventional mobile phone.

FIG. 16D illustrates a tabletop lighting device including a lighting portion 9401, a shade 9402, an adjustable arm 9403, a support 9404, a base 9405, and a power supply switch 9406. The tabletop lighting device includes a light-emitting device manufactured using one embodiment of the present invention as the lighting portion 9401. Note that the modes of the lighting device is not limited to tabletop lighting devices, but include ceiling-fixed lighting devices, wall-hanging lighting devices, portable lighting devices, and the like.

Figure 17:
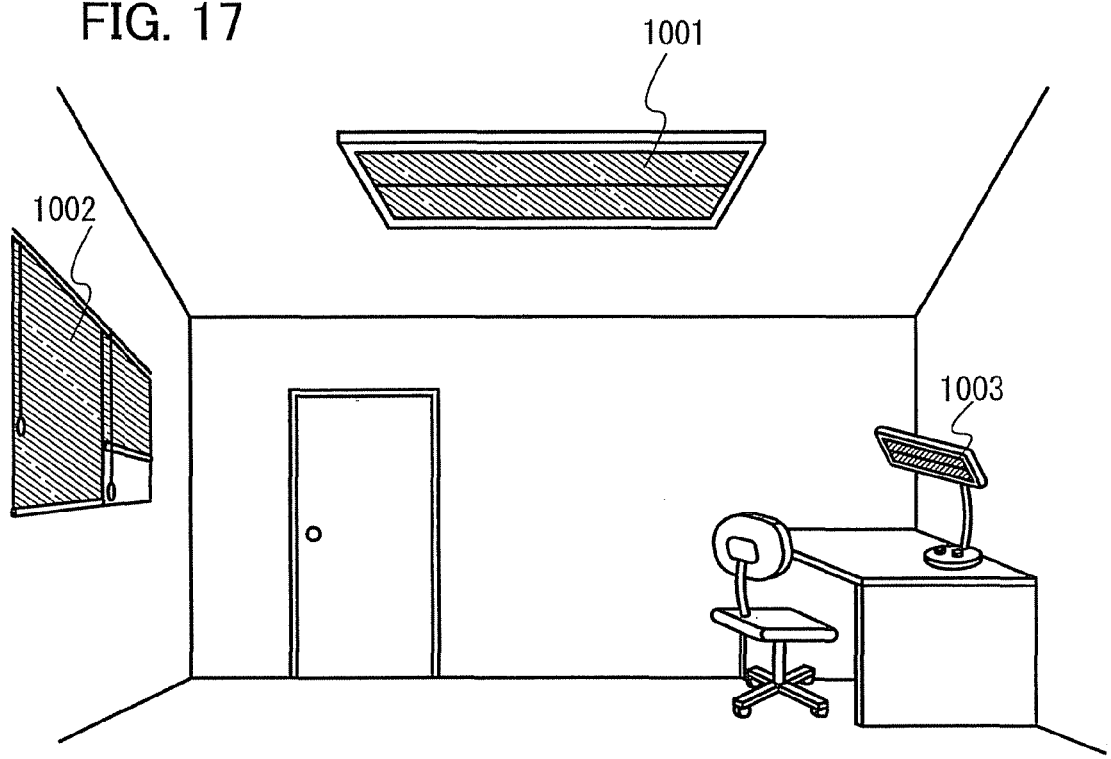
FIG. 17 illustrates an example of a lighting device according to one embodiment of the present invention.

FIG. 17 illustrates an example in which the light-emitting device manufactured using one embodiment of the present invention is used for an indoor lighting device 1001. Since the light-emitting device manufactured using one embodiment of the present invention can have a larger area, the light-emitting device can be used as a lighting device having a large area. In addition, the light-emitting device described in the above embodiments can be thinned and thus can also be used as a roll-up type lighting device 1002. In order to manufacture such a device, for example, an extra-thin glass substrate capable of being rolled up may be used as part of a glass sealed body. Even an extra-thin glass substrate capable of being rolled up is preferably applied to the present invention, because it does not easily transmit moisture, oxygen, or the like. As illustrated in FIG. 17, a tabletop lighting device 1003 illustrated in FIG. 16D may be used in a room provided with the indoor lighting device 1001.

The light-emitting device sealed using a method of manufacturing a sealed structure, which is described in the above embodiments, is employed, whereby a light-emitting element is less likely to deteriorate. Hence, by using the light-emitting device for the lighting device, the lighting device can have higher durability and a longer lifetime than a conventional lighting device.

Figure 18:
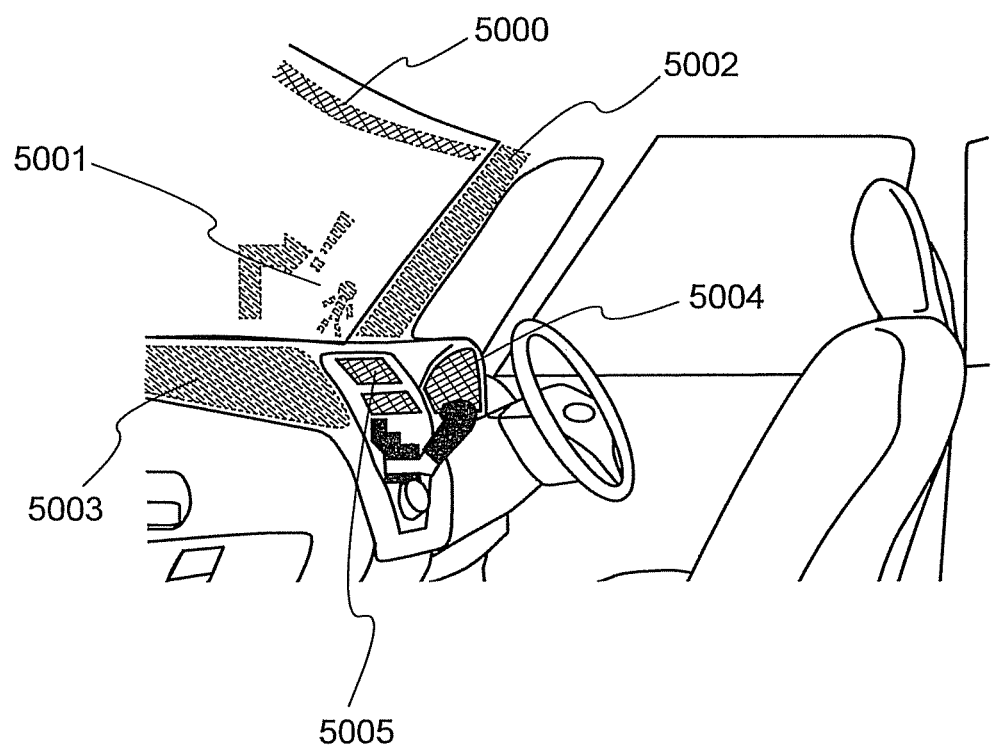
FIG. 18 illustrates examples of in-vehicle display devices according to one embodiment of the present invention.

FIG. 18 illustrates one mode in which the light-emitting device sealed using a method of manufacturing a sealed structure according to one embodiment of the present invention is used for an automobile windshield and an automobile dashboard.

Each of the display device 5000 and the display device 5001 is the light-emitting device which is provided for the automobile windshield and which is sealed with the glass frit layer 510 according to one embodiment of the present invention. The light-emitting element described in Embodiment 5 or Embodiment 6 can be formed into a so-called see-through display device, through which the opposite side can be seen, by including electrodes having a light-transmitting property as a first electrode and a second electrode. Such a see-through display device can be provided even in the automobile windshield, without hindering the vision. Note that when a transistor for driving is provided, a transistor having a light-transmitting property, such as an organic transistor using an organic semiconductor material or a transistor using an oxide semiconductor, is preferably used.

The display device 5002 is a display device which is provided in a pillar portion and which incorporates the light-emitting element described in Embodiment 5 or Embodiment 6. The display device 5002 can compensate for the view hindered by the pillar portion by showing an image taken by an imaging unit provided in the automobile body. Similarly, the display device 5003 provided in the dashboard can compensate for the view hindered by the automobile body by showing an image taken by an imaging unit provided in the outside of the automobile body, which leads to elimination of blind areas and enhancement of safety. Showing an image so as to compensate for the area which a driver cannot see, makes it possible for the driver to confirm safety easily and comfortably.

The display device 5004 and the display device 5005 can provide a variety of kinds of information such as information of navigation data, a speedometer, a tachometer, a mileage, a fuel meter, a gearshift indicator, and air-condition setting. The content or layout of the display can be changed freely by a user as appropriate. Further, such information can be shown by the display devices 5000 to 5003. Note that the display devices 5000 to 5005 can also be used as lighting devices.

The light-emitting device sealed using a method of manufacturing a sealed structure according to one embodiment of the present invention has high reliability, and hence, the light-emitting device is suitable for being mounted in a vehicle.

The methods and structures described in this embodiment can be combined as appropriate with any of the methods and structures described in the other embodiments.

(Embodiment 9)

Figure 19A:
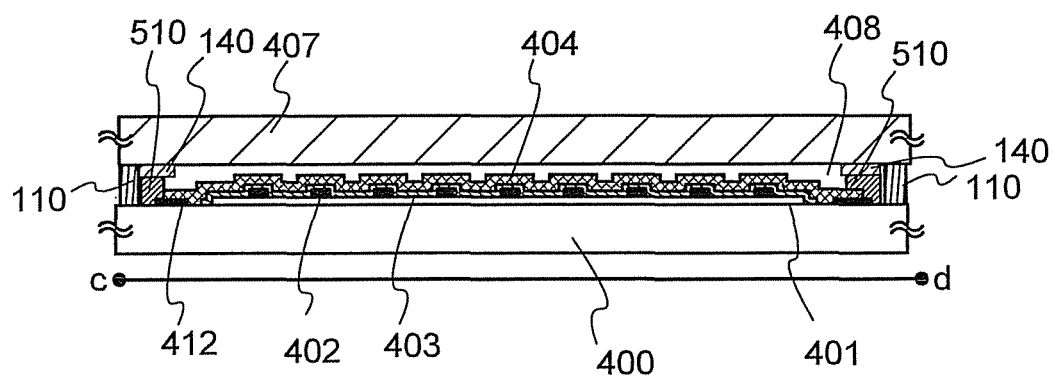
FIGS. 19A and 19B illustrate an example of a lighting device according to one embodiment of the present invention.
Figure 19B:
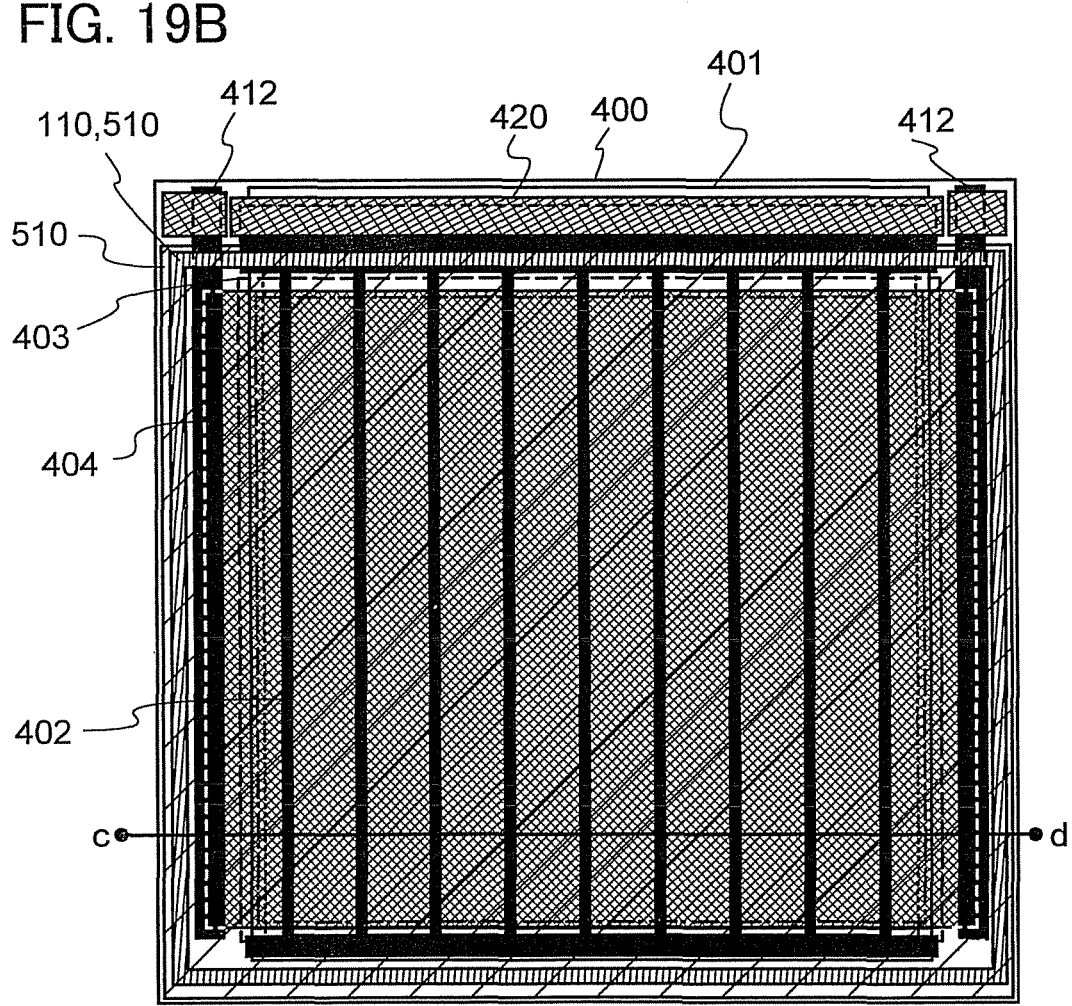

In this embodiment is described an example in which the light-emitting device sealed using a method of manufacturing a sealed structure according to one embodiment of the present invention is used as a lighting device, with reference to FIGS. 19A and 19B. Note that FIG. 19B is a plan view of the lighting device and FIG. 19A is a cross-sectional view taken along the line c-d in FIG. 19B.

In the lighting device in this embodiment, a first electrode 401 is formed over a glass substrate 400 which is a support and has a light-transmitting property. The glass substrate 400 and the first electrode 401 correspond to the first substrate 130 and the first electrode 102 in Embodiment 5, respectively.

An auxiliary wiring 402 is provided over the first electrode 401. Since this embodiment shows an example in which light emission is extracted by passing through the first electrode 401, the first electrode 401 is formed using a material having a light-transmitting property. The auxiliary wiring 402 is provided in order to compensate for low conductivity of the material having a light-transmitting property, and has a function of suppressing luminance unevenness in a light emission surface due to a voltage drop caused by high resistance of the first electrode 401. The auxiliary wiring 402 is formed using a material whose conductivity is higher than at least that of the material of the first electrode 401. For example, aluminum is preferably used. Note that surfaces of the auxiliary wiring 402 other than a portion thereof in contact with the first electrode 401 are preferably covered with an insulating layer. This is in order to suppress light emission over the upper portion of the auxiliary electrode 402, which cannot be extracted, so that a reactive current can be reduced and a reduction in power efficiency can be suppressed. Note that a pad 412 for applying a voltage to a second electrode 404 may be formed concurrently with the formation of the auxiliary wiring 402.

An organic EL layer 403 is formed over the first electrode 401 and the auxiliary wiring 402. The organic EL layer 403 has a structure corresponding to the structure of the organic EL layer 103 in Embodiment 6 or a structure in which the light-emitting units 511 and 512 and the charge generation layer 513 in Embodiment 6 are combined. Note that the organic EL layer 403 is preferably formed to be slightly larger than the first electrode 401 when seen from above so as to also serve as an insulating layer which prevents a short circuit between the first electrode 401 and the second electrode 404.

The second electrode 404 is formed to cover the organic EL layer 403. The second electrode 404 corresponds to the second electrode 104 in Embodiment 5 and has a similar structure. In this embodiment, it is preferable that the second electrode 404 be formed using a material having high reflectance because light emission is extracted through the first electrode 401 side. In this embodiment, the second electrode 404 is connected to the pad 412, whereby a voltage is applied.

In the above manner, the light-emitting element including the first electrode 401, the organic EL layer 403, and the second electrode 404 (and the auxiliary wiring 402) is sealed using a method of manufacturing a sealed structure according to one embodiment of the present invention, whereby the lighting device is completed. The inside space of the glass sealed structure is filled with an inert gas 408 or the like as described in the above embodiment. Alternatively, the inside space of the glass sealed structure may be filled with a solid that does not discharge moisture, oxygen, or the like.

When extended to the outside of the glass frit layer 510 and the sealing material 110, parts of the pad 412, the first electrode 401, and the auxiliary electrode 402 can each partly serve as external input terminals. An IC chip 420 mounted with a converter or the like may be provided over the external input terminals.

The lighting device sealed using a method of manufacturing a sealed structure according to one embodiment of the present invention has high reliability, and hence, the lighting device is suitable for being mounted in a vehicle.

This application is based on Japanese Patent Application Serial No. 2011-135125 filed with the Japan Patent Office on Jun. 17, 2011, the entire contents of which are hereby incorporated by reference.

What is claimed is:

1. A method of manufacturing a light-emitting device, comprising the steps of:
   forming a light-emitting element over a first substrate;
   forming a sealing material layer over the first substrate, whereby the light-emitting element is surrounded by the sealing material layer;
   forming a metal film by using a sputtering method over a second substrate;
   forming a buffer layer over the second substrate in a closed pattern by selectively etching the metal film;
   forming a frit paste comprising a frit material and a binder over the buffer layer, whereby the buffer layer is interposed between the frit paste and the second substrate, and an entity of the frit paste overlaps with the buffer layer;
   removing the binder and fusing the frit material by heat treatment, whereby a glass frit is formed;
   stacking the first substrate comprising the sealing material layer and the second substrate comprising the glass frit, whereby the first substrate and the second substrate are bonded with the sealing material layer and the light-emitting element is surrounded by the glass frit; and
   irradiating the buffer layer with laser light passing through the second substrate to melt the glass frit by a heat from the buffer layer heated by the irradiation, whereby the glass frit and the first substrate are bonded,
   wherein the buffer layer is arranged for surrounding the light-emitting element after stacking the first substrate and the second substrate, and
   wherein the second substrate is capable of transmitting the laser light.

2. The method of manufacturing a light-emitting device according to claim 1, wherein the glass frit forms a closed curve shape.

3. The method of manufacturing a light-emitting device according to claim 1, wherein an enclosed space is formed by the glass frit, the first substrate, and the second substrate.

4. The method of manufacturing a light-emitting device according to claim 1, wherein the sealing material layer forms a closed curve shape.

5. The method of manufacturing a light-emitting device according to claim 1, wherein the sealing material layer, the first substrate, and the second substrate form an enclosed space.

6. The method of manufacturing a light-emitting device according to claim 1, wherein the sealing material layer comprises a material selected from an ultraviolet curable resin and an epoxy resin.

7. The method of manufacturing a light-emitting device according to claim 1, wherein the buffer layer is capable of absorbing the laser light.

8. The method of manufacturing a light-emitting device according to claim 1, wherein the buffer layer comprises a material having a higher melting point than the glass frit.

9. The method of manufacturing a light-emitting device according to claim 8, wherein the material is selected from tungsten, tantalum, and iron.

10. A method of manufacturing a light-emitting device, comprising the steps of:
    forming a light-emitting element over a first substrate;
    forming a metal film by using a sputtering method over a second substrate;
    forming a buffer layer over the second substrate in a closed pattern by selectively etching the metal film;
    forming a frit paste comprising a frit material and a binder over the buffer layer, whereby the buffer layer is interposed between the frit paste and the second substrate, and an entity of the frit paste overlaps with the buffer layer;
    removing the binder and fusing the fit material by heat treatment, whereby a glass frit is formed;
    stacking the first substrate and the second substrate comprising the glass frit, whereby the light-emitting element is surrounded by the glass frit; and
    irradiating the buffer layer with laser light passing through the second substrate to melt the glass frit by a heat from the buffer layer heated by the irradiation, whereby the glass frit and the first substrate are bonded,
    wherein the buffer layer is arranged for surrounding the light-emitting element after stacking the first substrate and the second substrate.

11. The method of manufacturing a light-emitting device according to claim 10, wherein the buffer layer is selected from tungsten, tantalum and iron.

12. The method of manufacturing a light-emitting device according to claim 10, wherein the glass frit forms a closed curve shape.

13. The method of manufacturing a light-emitting device according to claim 10, wherein an enclosed space is formed by the glass frit, the first substrate, and the second substrate.

14. A method of manufacturing a light-emitting device, comprising the steps of:
- forming a light-emitting element over a first substrate;
- forming a sealing material layer over the first substrate, whereby the light-emitting element is surrounded by the sealing material layer;
- forming a metal film over a second substrate;
- forming a buffer layer over the second substrate in a closed pattern by selectively etching the metal film;
- forming a fit paste comprising a frit material and a binder over the buffer layer, whereby the buffer layer is interposed between the frit paste and the second substrate, and an entity of the frit paste overlaps with the buffer layer;
- removing the binder and fusing the frit material by heat treatment, whereby a glass frit is formed;
- stacking the first substrate comprising the sealing material layer and the second substrate comprising the glass frit, whereby the first substrate and the second substrate are bonded with the sealing material layer and the light-emitting element is surrounded by the glass frit; and
- irradiating the buffer layer with laser light passing through the second substrate to melt the glass frit by a heat from the buffer layer heated by the irradiation, whereby the glass fit and the first substrate are bonded,
- wherein the buffer layer is arranged for surrounding the light-emitting element after stacking the first substrate and the second substrate, and
- wherein the second substrate is capable of transmitting the laser light.

15. The method of manufacturing a light-emitting device according to claim 14, wherein the glass frit forms a closed curve shape.

16. The method of manufacturing a light-emitting device according to claim 14, wherein an enclosed space is formed by the glass frit, the first substrate, and the second substrate.

17. The method of manufacturing a light-emitting device according to claim 14, wherein the sealing material layer forms a closed curve shape.

18. The method of manufacturing a light-emitting device according to claim 14, wherein the sealing material layer, the first substrate, and the second substrate form an enclosed space.

19. The method of manufacturing a light-emitting device according to claim 14, wherein the sealing material layer comprises a material selected from an ultraviolet curable resin and an epoxy resin.

20. The method of manufacturing a light-emitting device according to claim 14, wherein the buffer layer comprises one selected from tungsten, tantalum, and iron.

* * * * *

UNITED STATES PATENT AND TRADEMARK OFFICE
CERTIFICATE OF CORRECTION

| | | |
|---|---|---|
| PATENT NO. | : 9,440,880 B2 | Page 1 of 1 |
| APPLICATION NO. | : 13/524203 | |
| DATED | : September 13, 2016 | |
| INVENTOR(S) | : Akihisa Shimomura | |

It is certified that error appears in the above-identified patent and that said Letters Patent is hereby corrected as shown below:

In the Specification

Column 16, Lines 17 to 18; Change "the hole-transport: layer" to --the hole-transport layer--.

Column 18, Line 61; Change "is; a" to --is, a--.

In the Claims

Column 28, Line 47, Claim 10; Change "the fit material" to --the frit material--.

Column 29, Line 10, Claim 14; Change "a fit paste" to --a frit paste--.

Column 29, Line 25, Claim 14; Change "glass fit and" to --glass frit and--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*